US008164310B2

(12) United States Patent
Takeuchi et al.

(10) Patent No.: US 8,164,310 B2
(45) Date of Patent: Apr. 24, 2012

(54) BATTERY TEMPERATURE REGULATOR INCORPORATING CASING OR TERMINAL TEMPERATURE SENSOR

(75) Inventors: Tomoyasu Takeuchi, Aichi-ken (JP); Hiroshi Ueshima, Anjo (JP); Ryuichirou Shinkai, Kariya (JP)

(73) Assignee: Denso Corporation, Kariya (JP)

( * ) Notice: Subject to any disclaimer, the term of this patent is extended or adjusted under 35 U.S.C. 154(b) by 583 days.

(21) Appl. No.: 12/362,728

(22) Filed: Jan. 30, 2009

(65) Prior Publication Data

US 2009/0195210 A1 Aug. 6, 2009

(30) Foreign Application Priority Data

Jan. 31, 2008 (JP) ................... 2008-020846

(51) Int. Cl.
*H02J 7/00* (2006.01)
(52) U.S. Cl. ...................................... 320/150
(58) Field of Classification Search .................. 320/150
See application file for complete search history.

(56) References Cited

U.S. PATENT DOCUMENTS

| 6,723,869 B1 | 4/2004 | Mori et al. | |
| 7,771,864 B2 | 8/2010 | Kiya et al. | |
| 2001/0011884 A1* | 8/2001 | Sakakibara | 320/150 |
| 2005/0162829 A1* | 7/2005 | Aker et al. | 361/695 |
| 2006/0060236 A1 | 3/2006 | Kim | |
| 2006/0110656 A1* | 5/2006 | Moores et al. | 429/83 |
| 2006/0220620 A1* | 10/2006 | Aradachi et al. | 320/150 |
| 2007/0178346 A1 | 8/2007 | Kiya et al. | |

FOREIGN PATENT DOCUMENTS

| CN | 1753242 | 3/2006 |
| CN | 1954457 | 4/2007 |
| JP | H05-343106 | 12/1993 |
| JP | 2001-091363 | 4/2001 |
| JP | 2001-187772 | 7/2001 |
| JP | 2002-056904 | 2/2002 |
| WO | WO 2006/077758 | 7/2006 |
| WO | WO 2007/050265 | 5/2007 |

OTHER PUBLICATIONS

Chinese Office Action dated Sep. 8, 2010 issued in corresponding Chinese Application No. 200910003715.1.

* cited by examiner

*Primary Examiner* — Arun Williams
(74) *Attorney, Agent, or Firm* — Nixon & Vanderhye PC

(57) ABSTRACT

A temperature regulator is provided for a battery which includes an electrode body, a terminal electrically connected to the electrode body, and a casing that receives the electrode body and supports the terminal with an end portion of the terminal protruding outside of the casing. The casing is electrically and thermally insulated from the terminal. The temperature regulator includes a flow producer, a temperature sensor, and a controller. The flow producer produces a flow of a heat transfer medium for exchanging heat between the heat transfer medium and one of the terminal and casing. The temperature sensor senses the temperature of the other of the terminal and casing. The controller controls, based on the temperature sensed by the temperature sensor, the flow producer to adjust the flow rate of the heat transfer medium, thereby regulating the temperature of the electrode body to fall within a predetermined range.

11 Claims, 14 Drawing Sheets

BATTERY TEMPERATURE REGULATOR INCORPORATING CASING OR TERMINAL TEMPERATURE SENSOR

CROSS-REFERENCE TO RELATED APPLICATION

This application is based on and claims priority from Japanese Patent Application No. 2008-20846, filed on Jan. 31, 2008, the content of which is hereby incorporated by reference in its entirety into this application.

BACKGROUND OF THE INVENTION

1. Technical Field of the Invention

The present invention relates generally to temperature regulators for regulating the temperature of batteries. More particularly, the invention relates to a temperature regulator for regulating the temperature of a battery in a motor vehicle, which has a temperature sensor suitably arranged in the battery.

2. Description of the Related Art

In recent years, high-output and high-energy capacity batteries, for example lithium batteries and nickel batteries, have been put to practical use as a driving source of motor vehicles. Such batteries generally each include an electrode body, a pair of terminals, and a casing, and are assembled together to form a battery pack.

When the battery pack is used as a driving source of a motor vehicle, it repeats intensive charge/discharge. As a result, the temperature of the battery pack will increase due to heat generated by the electrode bodies of the batteries with chemical reactions taking place therein, lowering the performance of the batteries.

To solve, the above problem, Japanese Patent First Publication No. 2002-56904 discloses a battery pack which is configured with a plurality of batteries and a heat dissipating plate that is fixed to the terminals of the batteries. With this configuration, the heat generated by the electrode bodies of the batteries during operation can be dissipated, via the terminals and heat dissipating plate, to the atmosphere surrounding the battery pack. Consequently, it is possible to suppress the temperature of the battery pack from increasing.

Moreover, for the above battery pack, it is also possible to send cooling air to the heat dissipating plate, thereby further effectively suppressing the temperature of the battery pack from increasing. Furthermore, it is possible to employ a temperature sensor to sense the temperature of one of the batteries of the battery pack and control the flow rate of the cooling air based on the temperature sensed by the temperature sensor, thereby regulating the temperature of the battery pack to fall within a predetermined range. Here, the predetermined range is a range within which the performance of the batteries can be kept sufficiently high.

However, in the above case, if the temperature sensor is not suitably arranged in the battery pack, it cannot accurately sense the temperature of the battery, more specifically, the temperature of the electrode body of the battery due to the influence of the cooling air. As a result, it is necessary to perform a complicated correction process for the temperature sensed by the temperature sensor so as to correctly estimate the actual temperature of the electrode body.

SUMMARY OF THE INVENTION

According to the present invention, there is provided a temperature regulator for a battery. The battery includes an electrode body, a terminal electrically connected to the electrode body, and a casing that receives the electrode body and supports the terminal with an end portion of the terminal protruding outside of the casing. The casing is electrically and thermally insulated from the terminal. The temperature regulator includes a flow producer, a temperature sensor, and a controller. The flow producer produces a flow of a heat transfer medium for exchanging heat between the heat transfer medium and one of the terminal and casing of the battery. The temperature sensor senses the temperature of the other of the terminal and casing of the battery. The controller controls, based on the temperature sensed by the temperature sensor, the flow producer to adjust the flow rate of the heat transfer medium, thereby regulating the temperature of the electrode body of the battery to fall within a predetermined range.

According to further implementations of the invention, the temperature regulator further includes a charge/discharge current adjuster that adjusts the charge/discharge current of the battery. The controller further controls, based on the temperature sensed by the temperature sensor, the charge/discharge current adjuster to adjust the charge/discharge current of the battery.

The temperature sensor is a first temperature sensor. The temperature regulator further includes a second temperature sensor that senses the temperature of the one of the terminal and casing of the battery which exchanges heat with the heat transfer medium. The controller controls, based on both the temperatures sensed by the first and second temperature sensors, the flow producer to adjust the flow rate of the heat transfer medium. The controller further controls, based on both the temperatures sensed by the first and second temperature sensors, the charge/discharge current adjuster to adjust the charge/discharge current of the battery.

The temperature sensor is completely covered by a cover.

The battery further includes a sealing member which is made of an electrically and thermally insulative material and via which the terminal is fixed to the casing. The temperature sensor is received in a recess formed in the sealing member. The cover is integrally formed with the sealing member to completely cover the temperature sensor.

The battery further includes a flow passage forming member that has formed therein a flow passage through which the heat transfer medium flows exchanging heat with the one of the terminal and casing of the battery.

The cover is integrally formed with the flow passage forming member of the battery.

The battery further includes a heat transferring member via which heat is exchanged between the heat transfer medium and the one of the terminal and casing of the battery. The heat transferring member has higher heat-transferring capability than the one of the terminal and casing.

The heat transferring member is fixed to the flow passage forming member of the battery.

The battery and the temperature regulator are used in a motor vehicle.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Preferred embodiments of the present invention will be described hereinafter with reference to FIGS. 1-17. In the preferred embodiments, temperature regulators according to the invention are applied to regulate the temperature of lithium-ion batteries in motor vehicles.

First Embodiment

Figure 1:
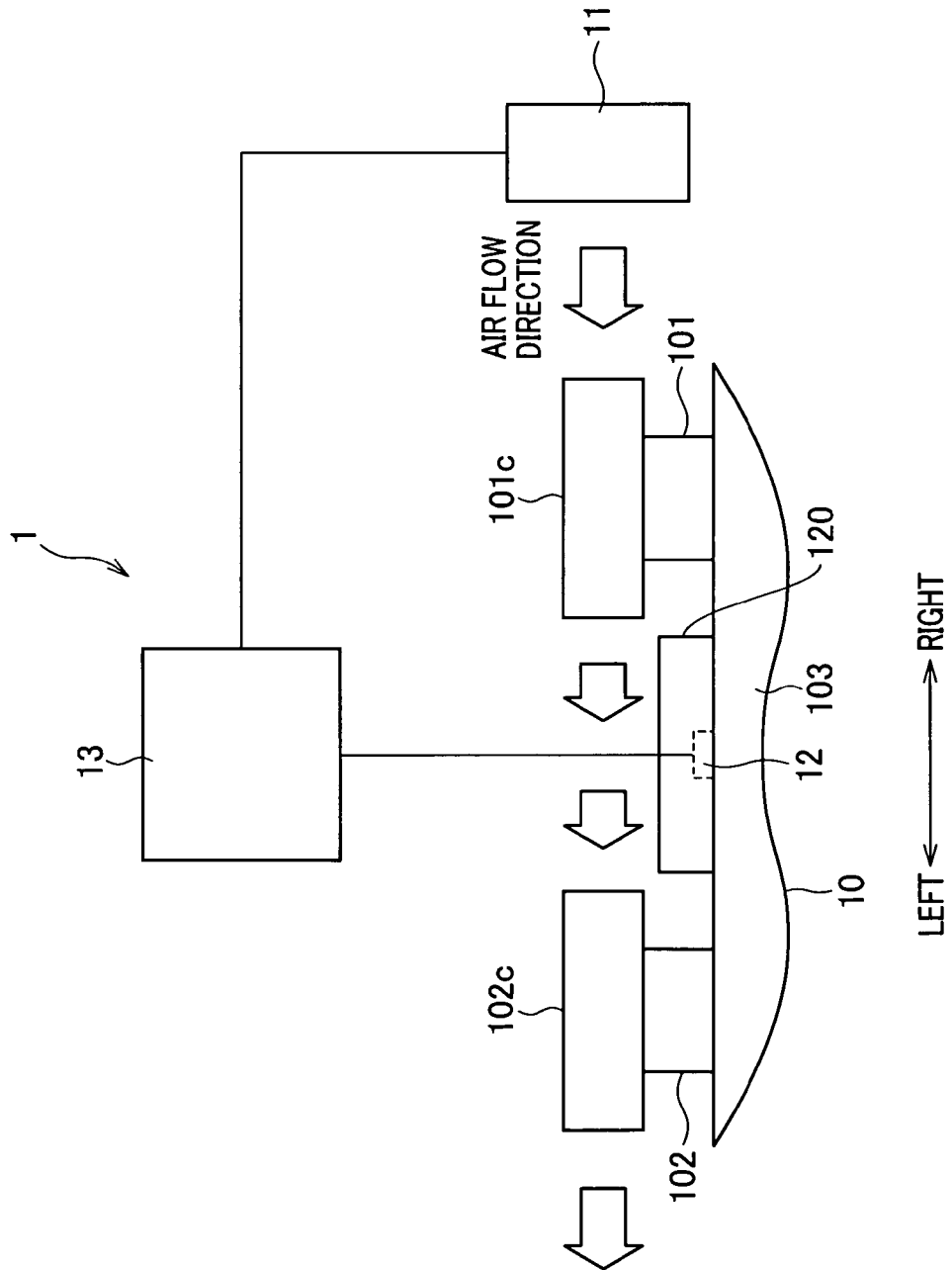
FIG. 1 is a schematic view showing the overall configuration of a temperature regulator according to the first embodiment of the invention, which regulates the temperature of a battery.
Figure 2:
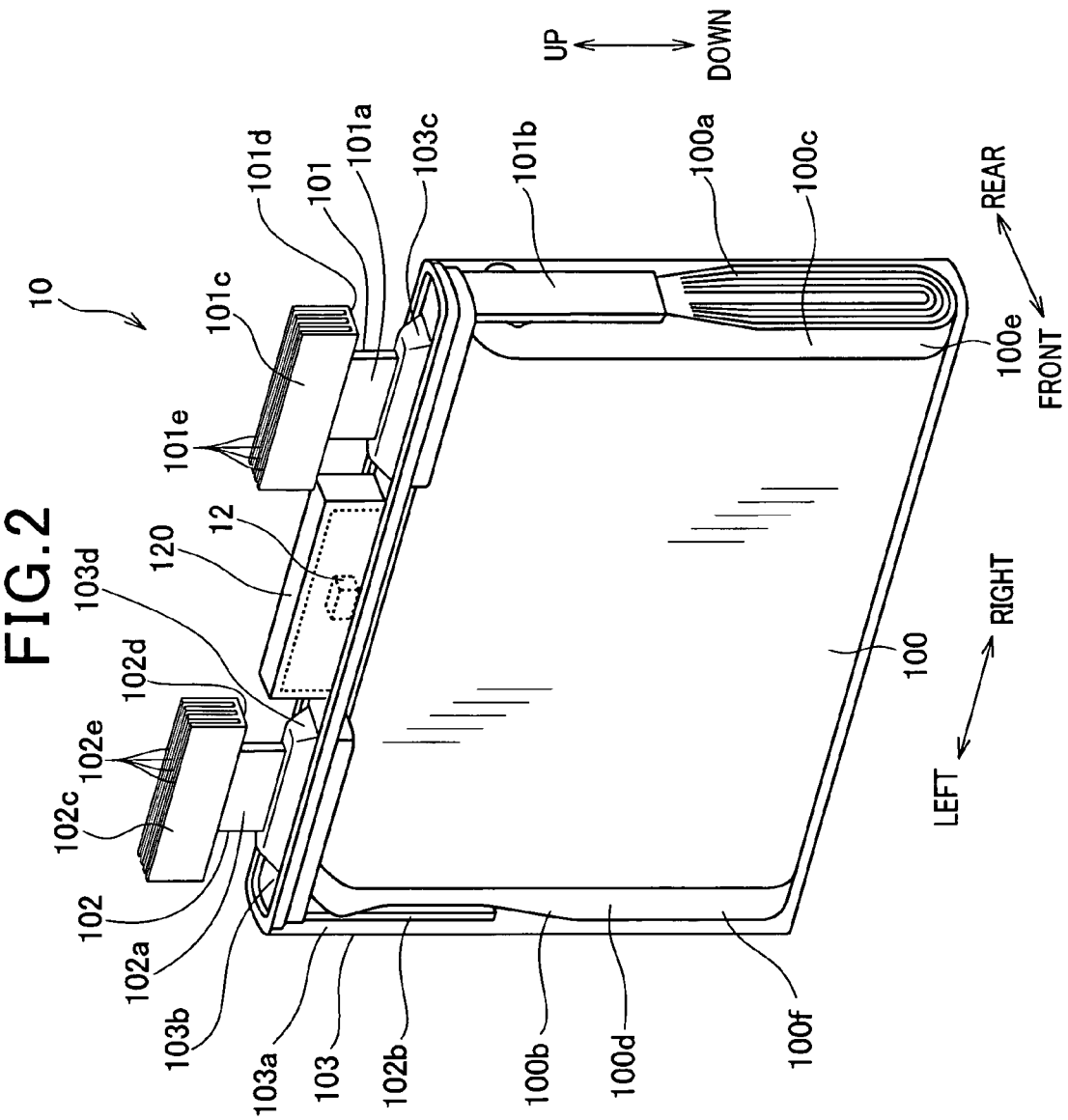
FIG. 2 is a perspective fragmentary view showing the overall configuration of the battery.

FIG. 1 shows the overall configuration of a temperature regulator 1 according to the first embodiment of the invention. The temperature regulator 1 is designed to regulate the temperature of a lithium-ion battery 10 in a motor vehicle. FIG. 2 shows the overall configuration of the lithium-ion battery 10. It should be noted that in FIGS. 1 and 2, the forward and backward directions, leftward and rightward directions, and upward and downward directions are introduced only for convenience of explanation.

As shown in FIG. 2, the battery 10 includes an electrode body 100, a cathode terminal 101, an anode terminal 102, and a casing 103.

The electrode body 100 is made up of a cathode sheet 100a, an anode sheet 100b, and a separator sheet (not shown).

The cathode sheet 100a includes a cathode collector and a pair of cathode active material layers. The cathode collector is made of an aluminum strip. The cathode active material layers contain a lithium nickel oxide, a binder, and an electrically conductive material; further, they are respectively formed on opposite major surfaces of the cathode collector. Moreover, the cathode collector has a widthwise end portion that is not covered by the cathode active material layers, forming an uncovered portion 100c of the cathode sheet 100a.

The anode sheet 100b includes an anode collector and a pair of anode active material layers. The anode collector is made of a copper strip. The anode active material layers contain graphite and a binder; further, they are respectively formed on opposite major surfaces of the anode collector. Moreover, the anode collector has a widthwise end portion that is not covered by the anode active material layers, forming an uncovered portion 100d of the anode sheet 100b.

The separator sheet is made of, for example, a polyethylene and microporous in structure.

The cathode and anode sheets 100a and 100b are first stacked together with the separator sheet interposed therebetween, and then integrally wound to form the electrode body 100 which is flat and thin in shape. Moreover, in the resultant electrode body 100, the uncovered portion 100c of the cathode sheet 100a makes up a right end portion 100e of the electrode body 100, while the uncovered portion 100d of the anode sheet 100b makes up a left end portion 100f of the electrode body 100.

The cathode terminal 101 is made of aluminum, and provided to electrically connect the cathode sheet 100a of the electrode body 100 to an external device or circuit. The cathode terminal 101 includes a terminal portion 101a and a connection portion 101b. The terminal portion 101a has the shape of a rectangular plate, and is connected to the external device or circuit. The connection portion 101b also has the shape of a rectangular plate, and is connected to the cathode sheet 100a of the electrode body 100. More specifically, the connection portion 101b is electrically connected to the right end portion 100e of the electrode body 100.

The anode terminal 102 is made of copper, and provided to electrically connect the anode sheet 100b of the electrode body 100 to the external device or circuit. The anode terminal 102 includes a terminal portion 102a and a connection portion 102b. The terminal portion 102a has the shape of a rectangular plate, and is connected to the external device or circuit. The connection portion 102b also has the shape of a rectangular plate, and is connected to the anode sheet 100b of the electrode body 100. More specifically, the connection portion 102b is electrically connected to the left end portion 100f of the electrode body 100.

The casing 103 is made of aluminum and has the shape of a rectangular box. The casing 103 receives therein the electrode body 100, and supports both the cathode terminal 101 and anode terminal 102 with those terminals connected to the electrode body 100.

More specifically, the casing 103 includes a body portion 103a and a lid portion 103b. The body portion 103a has the shape of a rectangular tube with one end closed. The lid portion 103b has the shape of a rectangular plate. The electrode body 100, which has the cathode and anode terminals 101 and 102 connected thereto, is received within the body portion 103a of the casing 103 via a thermally-conductive insulation sheet (not shown). Further, an electrolyte solution is filled in the body portion 103a of the casing 103.

The lid portion 103b of the casing 103 closes the open end of the body portion 103a. The cathode terminal 101 and anode terminal 102 are fixed, respectively via sealing members 103c and 103d, to the lid portion 103b with both the terminal portion 101a of the cathode terminal 101 and the terminal portion 102a of the anode terminal 102 protruding outside of the casing 103. Both the sealing members 103c and 103d are made of an electrically and thermally insulative resin, so that both the cathode terminal 101 and anode terminal 102 are electrically and thermally insulated from the casing 103.

In the present embodiment, the battery 10 further includes a pair of heat sinks 101c and 102c, which are respectively both thermally and electrically connected to the ends of the terminal portions 101a and 102a of the cathode and anode terminals 101 and 102 protruding outside of the casing 103. The heat sinks 101c and 102c absorb the heat generated by the electrode body 100 via the cathode and anode terminals 101 and 102, and dissipate the absorbed heat via cooling air flowing through them. The heat sinks 101c and 102c are made of aluminum, and each have a large surface area contacting the cooling air so as to have higher heat-transferring capability than the cathode and anode terminals 101 and 102.

More specifically, in the present embodiment, the heat sink 101c includes a base portion 101d and a plurality of fins 101e. The base portion 101d has the shape of a rectangular plate. Each of the fins 101e has the shape of a rectangular plate and stands on the base portion 101d to extend in the lengthwise direction of the base portion 101d. Further, the fins 101e are spaced in the widthwise direction of the based portion 101d at predetermined intervals. Moreover, the heat sink 101c is so oriented in the battery 10 that the lengthwise direction of the base portion 101d of the heat sink 101c coincides with the leftward/rightward direction of the battery 10.

Similarly, the heat sink 102c includes a base portion 102d and a plurality of fins 102e. The base portion 102d has the shape of a rectangular plate. Each of the fins 102e has the shape of a rectangular plate and stands on the base portion 102d to extend in the lengthwise direction of the base portion 102d. Further, the fins 102e are spaced in the widthwise direction of the based portion 102d at predetermined intervals. Moreover, the heat sink 102c is so oriented in the battery 10 that the lengthwise direction of the base portion 102d of the heat sink 102c coincides with the leftward/rightward direction of the battery 10.

Referring now to FIG. 1, the temperature regulator 1 is configured with a fan 11, a temperature sensor 12, and a controller 13.

The fan 11 is provided to produce a flow of the cooling air passing through the heat sinks 101c and 102c, thereby cooling the cathode and anode terminals 101 and 102. More specifically, the fan 11 is located on the right side of the heat sink 101c in close vicinity thereto, and produces the flow of the cooling air in the leftward direction. In addition, the fan 11 is controlled by the controller 13 to adjust the flow rate of the cooling air.

The temperature sensor 12 is provided to sense the temperature of the casing 103 that is not exposed to the flow of the cooling air and is thus not directly cooled by the cooling air. More specifically, the temperature sensor 12 is mounted, as shown in FIG. 2, on a central portion of the lid portion 103b of the casing 103 to sense the temperature of the lid portion 103b. Further, the temperature sensor 12 is completely covered by a cover 120. The cover 120 is made of a thermally insulative resin, and has the shape of an open rectangular box with the open end closed by the lid portion 103b of the casing 103.

The controller 13 is provided to regulate the temperature of the electrode body 100. More specifically, the controller 13 controls, based on the temperature sensed by the temperature sensor 12, the fan 11 to adjust the flow rate of the cooling air, thereby regulating the temperature of the electrode body 100. To this end, the controller 13 has an input terminal connected to the temperature sensor 12, via which it inputs from the temperature sensor 12 a signal that indicates the temperature sensed by the temperature sensor 12. The controller 13 also has an output terminal connected to the fan 11, via which it outputs to the fan 11 a signal that indicates the flow rate of the cooling air to be discharged by the fan 11.

After having described the overall configuration of the temperature regulator 1 according to the present embodiment, operation thereof will be described hereinafter.

When the battery 10 is used in the motor vehicle, it discharges to power various electrical and electronic devices (not shown) mounted on the vehicle. Moreover, when the terminal voltage of the battery 10 is lowered below a predetermined value, it is charged by an automotive alternator (not shown) mounted on the vehicle. With the battery 10 repeating such discharge/charge, heat is generated by the electrode body 100, increasing the temperature of the electrode body 100. Moreover, the heat generated by the electrode body 100 is transmitted to the cathode and anode terminals 101 and 102 which are connected to the electrode body 100 as well as to the casing 103 within which the electrode body 10 is received.

The temperature sensor 12 senses the temperature of the lid portion 103b of the casing 103, and outputs the signal which indicates the sensed temperature to the controller 13. Then, the controller 13 controls, based on the temperature sensed by the temperature sensor 12, the fan 11 to adjust the flow rate of the cooling air, thereby regulating the temperature of the electrode body 100.

More specifically, when the temperature sensed by the temperature sensor 12 is above a predetermined range, the controller 13 controls the fan 11 to start its operation when it is stopped or to discharge more of the cooling air when it is running. Here, the predetermined range is a range within which the performance of the battery 10 can be kept sufficiently high. The cooling air discharged by the fan 11 flows leftward to pass through the heat sinks 101e and 102C, thereby cooling those heat sinks. Consequently, the electrode body 100 and thus the casing 103 are also cooled via the cathode and anode terminals 101 and 102 and heat sinks 101c and 102C, thereby decreasing the temperature of the electrode body 100 to the predetermined range. As a result, the temperature of the electrode body 100 can be regulated to fall within the predetermined range.

On the other hand, when the temperature sensed by the temperature sensor 12 is below the predetermined range, the controller 13 controls the fan 11 to discharge less of the cooling air or event to stop its operation. Consequently, the cooling of the electrode body 100 is restrained, and thus the heat generated by the electrode body 100 during the repeated discharge/charge of the battery 10 brings the temperature of the electrode body 100 to the predetermined range. As a result, the temperature of the electrode body 100 can be regulated to fall within the predetermined range.

To ascertain the effect of the arrangement of the temperature sensor 12 according to the present embodiment, an experiment has been conducted by the inventors.

Figure 3:
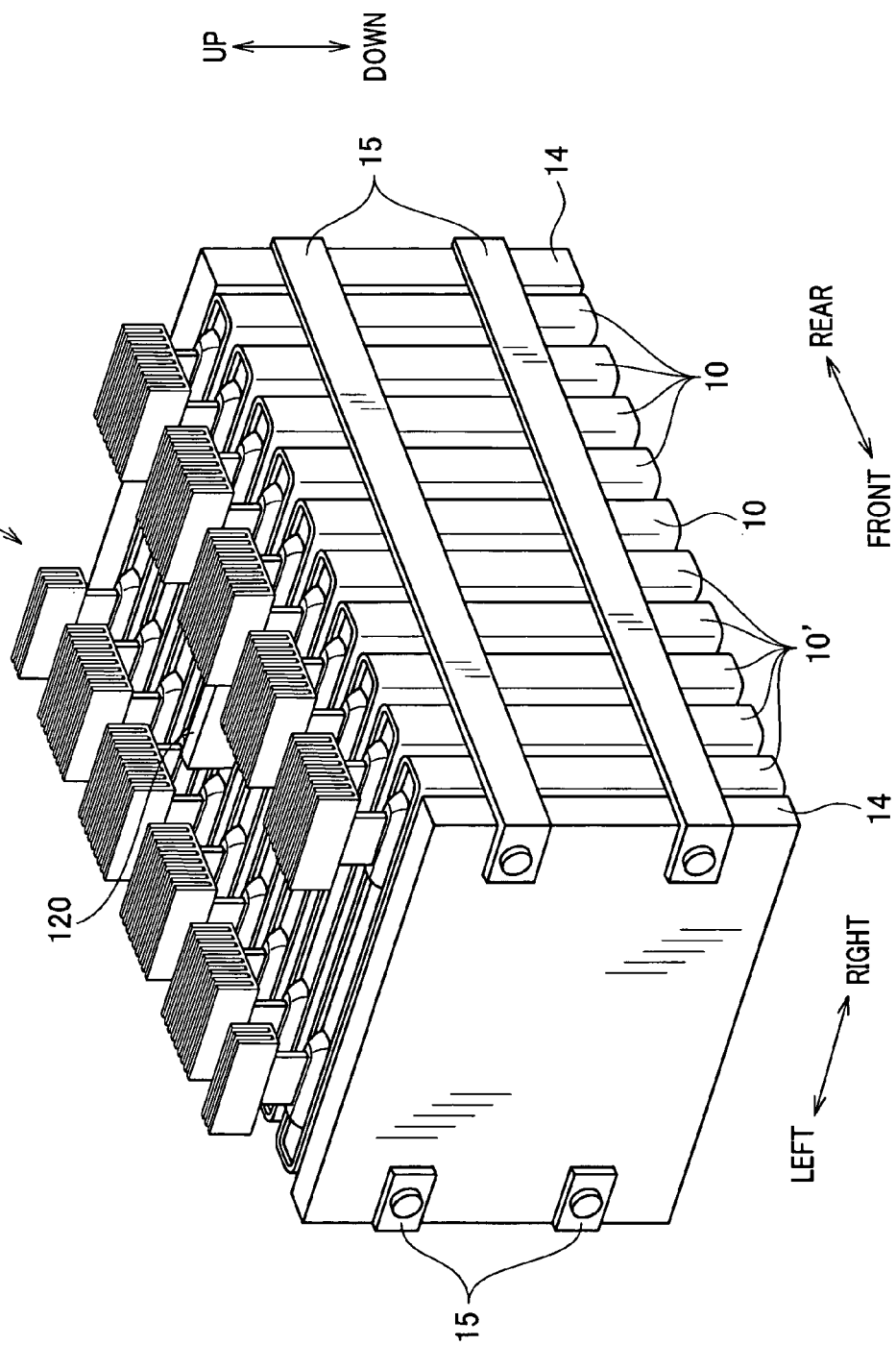
FIG. 3 is a perspective view of a battery pack tested in the first embodiment.

FIG. 3 shows a battery pack A tested in the experiment. The battery pack A was obtained by assembling the battery 10 shown in FIG. 2 with nine batteries 10'. Each of the batteries 10' had the same structure as the battery 10, but no temperature sensor 12 mounted thereon. All the batteries 10 and 10' were superposed in the forward/backward direction of the battery 10 to abut one another. The battery 10 was located almost at the center of the battery pack A in the forward/backward direction. The battery pack A further included a pair of holding members 14 that were respectively disposed at the front and rear ends of the battery pack A to hold the batteries 10 and 10' therebetween by means of a plurality of connecting members 15. Moreover, the batteries 10 and 10' were electrically connected in series by joining adjacent pairs of one of the heat sinks 101c and one of the heat sinks 102c of the batteries 10 and 10'.

Furthermore, in the battery 10, there were further provided two temperature sensors, more specifically two thermocouples, in addition to the temperature sensor 12. The first thermocouple was mounted on the outer surface of the electrode body 100 to sense the temperature of the electrode body 100. On the other hand, the second thermocouple was mounted on the outer surface of the heat sink 101c to sense the temperature of the heat sink 101.

With the above battery pack A, charge/discharge was repeated at time intervals of 30 s with the cooling air of 30° C. flowing through the heat sinks 101c and 102c of the battery 10 at a flow rate of 30 m³/h. The temperatures sensed by the temperature sensor 12 and the first and second thermocouples were recorded for three times respectively when the charge/discharge current of the battery 10 was 10 A, 20 A, and 36 A.

TABLE 1 shows the results of the experiment. As seen from TABLE 1, the temperature of the electrode body 100 sensed by the first thermocouple was 31.8° C., 36.2° C., and 42.6° C. In comparison, the temperature of the heat sink 101c sensed by the second thermocouple was 31.2° C., 34.7° C., and 39.4° C. Thus, the deviation of the temperature of the heat sink 101c from the temperature of the electrode body 100 was in the range of 0.6 to 3.2° C. On the other hand, the temperature of the casing 103 sensed by the temperature sensor 12 was 31.79° C., 36.0° C., and 42.2° C. Thus, the deviation of the temperature sensed by the temperature sensor 12 from the temperature of the electrode body 100 was in the range of 0.1 to 0.4° C.

TABLE 1

| CHARGE/ DISCHARGE CURRENT | TEMPERATURE OF ELECTRODE BODY | TEMPERATURE SENSED BY SENSOR 12 | TEMPERATURE OF HEAT SINK |
|---|---|---|---|
| 10 A | 31.8° C. | 31.7° C. | 31.2° C. |
| 20 A | 36.2° C. | 36.0° C. | 34.7° C. |
| 36 A | 42.6° C. | 42.2° C. | 39.4° C. |

Consequently, it is made clear from the experiment that with the above arrangement of the temperature sensor 12 according to the present embodiment, the temperature sensed by the temperature sensor 12 can represent, with high accuracy, the temperature of the electrode body 100. Otherwise, if the temperature sensor 12 was arranged on the outer surface of the heat sink 101c, the temperature sensed by the temperature sensor 12 could not accurately represent the temperature of the electrode body 100.

The above-described temperature regulator 1 according to the present embodiment has the following advantages.

In the present embodiment, the temperature regulator 1 is configured with the fan 11, the temperature sensor 12, and the controller 13. The fan 11 produces the flow of the cooling air passing through the heat sinks 101c and 102c of the battery 10. The heat sinks 101c and 102c are respectively both thermally and electrically connected to the ends of the cathode and anode terminals 101 and 102 protruding outside of the casing 103. The temperature sensor 12 is mounted on the lid portion 103b of the casing 103 of the battery 10 to sense the temperature of the casing 103. The casing 103 is thermally and electrically insulated from the cathode and anode terminals 101 and 102 via the sealing members 103c and 103d. The controller 13 controls, based on the temperature sensed by the temperature sensor 12, the fan 11 to adjust the flow rate of the cooling air, thereby regulating the temperature of the electrode body 100 of the battery 10 to fall within the predetermined range.

To suitably regulate the temperature of the electrode body 100, it is first necessary to accurately sense the temperature of the electrode body 100. Further, to accurately sense the temperature of the electrode body 100, it is ideal for the temperature sensor 12 to be directly mounted on the electrode body 100. However, in this case, it would be difficult to make electrical connection between the temperature sensor 12 and the controller 13 because the electrode body 100 is completely enclosed by the casing 103.

With the above configuration of the temperature regulator 1, the temperature sensor 12 is mounted on the casing 103 to sense the temperature of the casing 103. The casing 103 is not exposed to the flow of the cooling air, and is thus not directly cooled by the cooling air. The casing 103 is also thermally insulated from the cathode and anode terminals 101 and 102. On the other hand, the casing 103 receives therein the electrode body 100. Therefore, as made clear from the above experiment, the temperature sensed by the temperature sensor 12 can accurately represent the temperature of the electrode body 100. Consequently, based on the temperature sensed by the temperature sensor 12, the controller 13 can suitably regulate the temperature of the electrode body 100 without performing a correction process for determining the temperature of the electrode body 100. Moreover, with the temperature sensor 12 mounted on the lid portion 103b of the casing 103, it is easy to make electrical connection between the temperature sensor 12 and the controller 13.

Accordingly, with the above configuration, the temperature regulator 1 can suitably and easily regulate the temperature of the electrode body 100.

Further, in the present embodiment, the temperature sensor 12 is completely covered by the cover 120. Consequently, the temperature sensor 12 is completely isolated from the cooling air. As a result, without being directly influenced by the cooling air, the temperature sensed by the temperature sensor 12 can more accurately represent the temperature of the electrode body 100.

In the present embodiment, the cathode and anode terminals 101 and 102 of the battery 10 are respectively thermally connected to the heat sinks 101c and 102c which have higher heat-transferring capability than the cathode and anode terminals 101 and 102. Consequently, via the heat sinks 101c and 102c, the cathode and anode terminals 101 and 102 can be effectively cooled by the cooling air.

In the present embodiment, the battery 10 and the temperature regulator 1 are used in a motor vehicle. In such a case, the battery 10 is generally received in the engine compartment of the vehicle, where there are also received a number of devices or machines generating heat. However, with the temperature regulator 1, it is still possible to suitably regulate the temperature of the electrode body 100 of the battery 10.

Second Embodiment

This embodiment illustrates a temperature regulator 2 which has a similar configuration to the temperature regulator 1 according to the first embodiment. Accordingly, only the difference of the temperature regulator 2 from the temperature regulator 1 will be described hereinafter.

Figure 4:
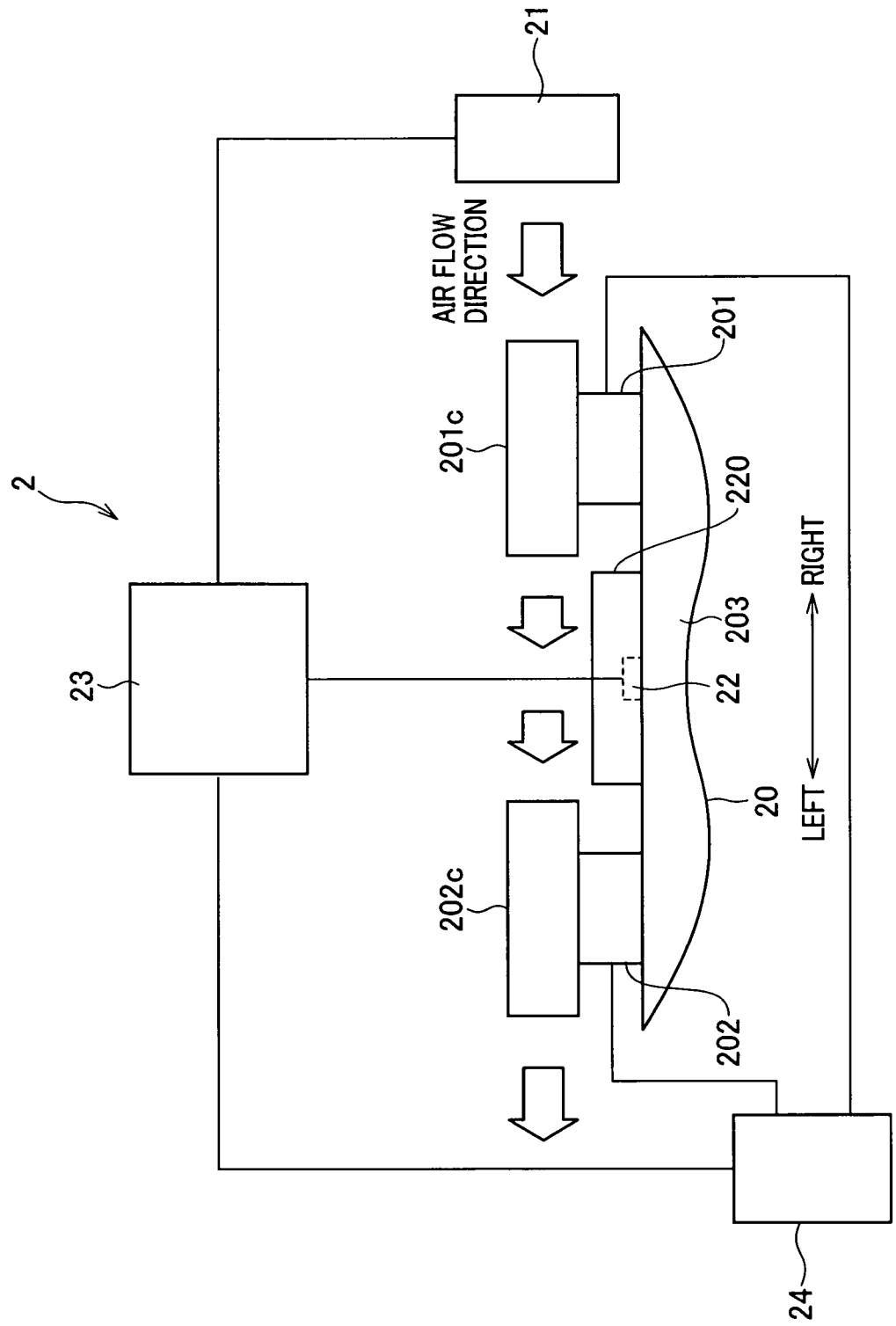
FIG. 4 is a schematic view showing the overall configuration of a temperature regulator according to the second embodiment of the invention.

FIG. 4 shows the overall configuration of the temperature regulator 2, which is designed to regulate the temperature of a lithium-ion battery 20 in a motor vehicle. It should be noted that in FIG. 4, the leftward and rightward directions are introduced only for convenience of explanation.

The battery 20 includes an electrode body 200 (not shown), a cathode terminal 201, an anode terminal 202, a casing 203, and heat sinks 201c and 202c, which are respectively identical to the electrode body 100, cathode terminal 101, anode terminal 102, casing 103 and heat sinks 101c and 102c of the battery 10 according to the first embodiment.

The temperature regulator 2 is configured with a fan 21, a temperature sensor 22, a controller 23, and a charge/discharge current adjuster 24.

The fan 21 and the temperature sensor 22 are respectively identical to the fan 11 and temperature sensor 12 of the temperature regulator 1 according to the first embodiment. The temperature sensor 22 is mounted on the casing 203 of the battery 20, and is completely covered by a cover 220.

The controller 23 controls, based on the temperature sensed by the temperature sensor 22, the fan 21 to adjust the flow rate of the cooling air and the charge/discharge current adjuster 24 to adjust the charge/discharge current of the battery 20, thereby regulating the temperature of the electrode body 200 of the battery 20. To this end, the controller 23 has an input terminal connected to the temperature sensor 22, via which it inputs from the temperature sensor 22 a signal that indicates the temperature sensed by the temperature sensor 22. The controller 23 also has an output terminal connected to the fan 21, via which it outputs to the fan 21 a signal that indicates the flow rate of the cooling air to be discharged by the fan 21. The controller 23 further has an output terminal connected to the charge/discharge current adjuster 24, via which it outputs to the charge/discharge current adjuster 24 a signal that indicates the current to be charged into or discharged from the battery 20.

The charge/discharge current adjuster 24 adjusts, under control of the controller 23, the charge/discharge current of the battery 20. The charge/discharge current adjuster 24 has an input terminal that is connected to the output terminal of the controller 23; it also has a pair of output terminals that are respectively connected to the cathode and anode terminals 201 and 202 of the battery 20.

Next, with reference to FIG. 4, operation of the temperature regulator 2 will be described.

When the temperature sensed by the temperature sensor 22 is above a predetermined range, the controller 23 controls the fan 21 to start its operation when it is stopped or to discharge more of the cooling air when it is running. Here, the predetermined range has the same definition as in the first embodiment. Simultaneously or alternatively, the controller 23 controls the charge/discharge current adjuster 24 to decrease the charge/discharge current of the battery 20. Consequently, the electrode body 200 of the battery is cooled via the cathode and anode terminals 201 and 202 and heat sinks 201c and 202c and/or comes to generate less heat, thereby decreasing the temperature of the electrode body 200 to the predetermined range. As a result, the temperature of the electrode body 200 can be regulated to fall within the predetermined range.

On the other hand, when the temperature sensed by the temperature sensor 22 is below the predetermined range, the controller 23 controls the fan 21 to discharge less of the cooling air or even to stop its operation. Simultaneously or alternatively, the controller 23 controls the charge/discharge current adjuster 24 to increase the charge/discharge current of the battery 20. Consequently, the cooling of the electrode body 200 is restrained and/or the electrode body 200 comes to generate more heat, thereby increasing the temperature of the electrode body 200 to the predetermined range. As a result, the temperature of the electrode body 200 can be regulated to fall within the predetermined range.

The above-described temperature regulator 2 according to the present embodiment has the following advantages.

In the present embodiment, the temperature regulator 2 includes the charge/discharge current adjuster 24 for adjusting the charge/discharge current of the battery 20 as well as the fan 21 for producing the flow of the cooling air. The controller 23 controls, based on the temperature sensed by the temperature sensor 22, the fan 21 to adjust the flow rate of the cooling air and the charge/discharge current adjuster 24 to adjust the charge/discharge current of the battery 20, thereby regulating the temperature of the electrode body 200 of the battery 20 to fall within the predetermined range.

With the above configuration, the temperature regulator 2 can more efficiently regulate the temperature of the electrode body 200. In addition, when one of the fan 21 and charge/discharge current adjuster 24 is in a fault condition, it is still possible for the temperature regulator 2 to regulate the temperature of the electrode body 200 via the other one.

Third Embodiment

This embodiment illustrates a temperature regulator 3 which has a similar configuration to the temperature regulator 1 according to the first embodiment. Accordingly, only the difference of the temperature regulator 3 from the temperature regulator 1 will be described hereinafter.

Figure 5:
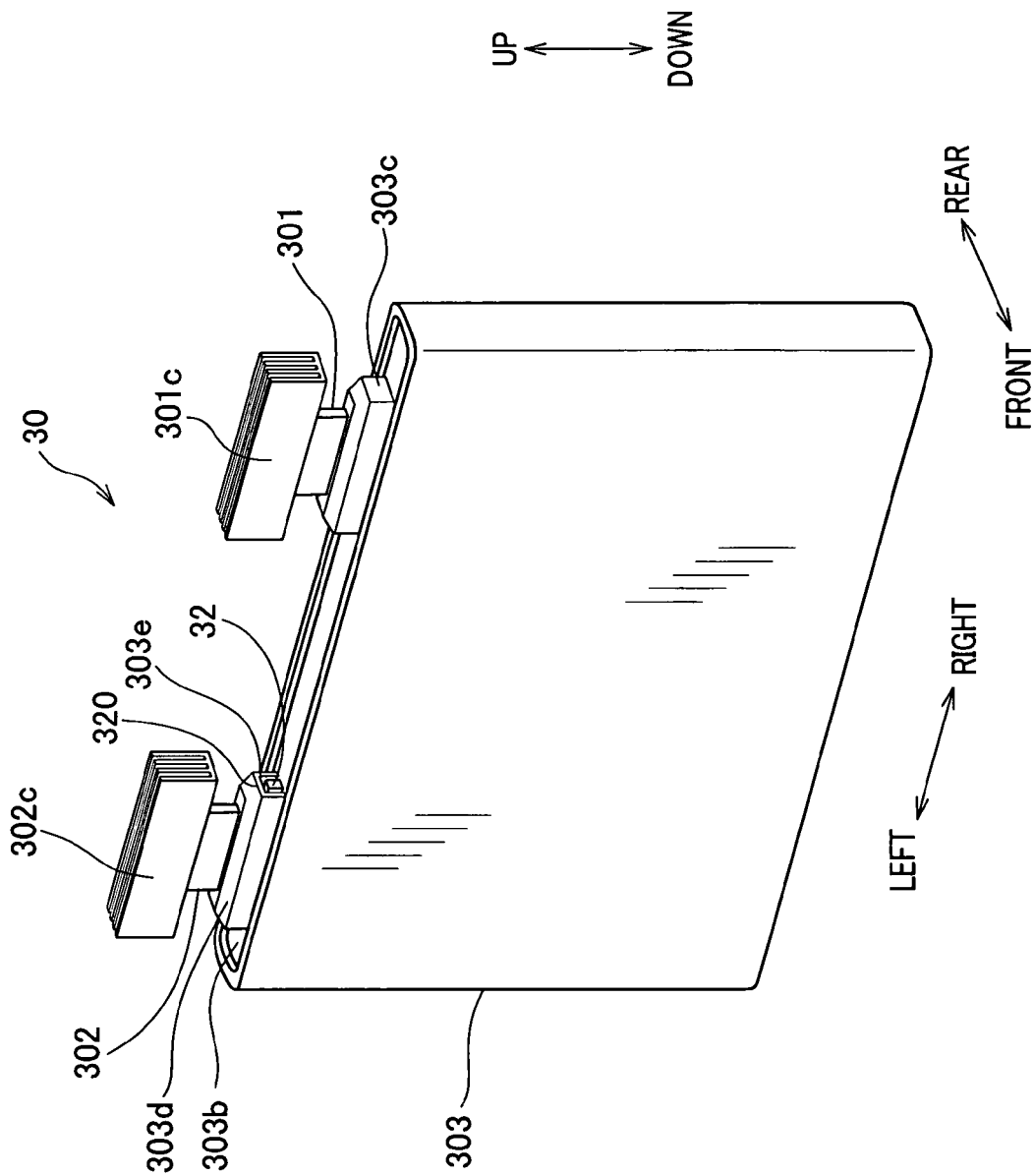
FIG. 5 is a perspective view of a battery according to the third embodiment of the invention.

The temperature regulator 3 is designed to regulate the temperature of a lithium-ion battery 30 in a motor vehicle. FIG. 5 shows the overall configuration of the battery 30. It should be noted that in FIG. 5, the forward and backward directions, leftward and rightward directions, and upward and downward directions are introduced only for convenience of explanation.

The battery 30 includes an electrode body 300 (not shown), a cathode terminal 301, an anode terminal 302, a casing 303, and heat sinks 301c and 302c, which are respectively identical to the electrode body 100, cathode terminal 101, anode terminal 102, casing 103 and heat sinks 101c and 102c of the battery 10 according to the first embodiment.

The cathode terminal 301 and anode terminal 302 are fixed to the lid portion 303b of the casing 303 respectively via sealing members 303c and 303d. Both the sealing members 303c and 303d are made of an electrically and thermally insulative resin, so that both the cathode terminal 301 and anode terminal 302 are electrically and thermally insulated from the casing 303.

The temperature regulator 3 is configured with a fan 31 (not shown), a temperature sensor 32, and a controller 33 (not shown), which are respectively identical to the fan 11, temperature sensor 12 and controller 13 of the temperature regulator 1 according to the first embodiment.

However, in the present embodiment, the temperature sensor 32 is received in a recess 303e that is formed in a side surface of the sealing member 303d. Further, the temperature sensor 32 is completely covered by a cover 320 that is integrally formed with the sealing member 303d.

With the above arrangement of the temperature sensor 32, it is possible to reliably eliminate the influence of the cooling air on the temperature sensor 32. This is because both the sealing member 303d and the cover 320 are thermally insulative. Moreover, with the integral formation of the cover 320 with the sealing member 303d, the number of components of the battery 30 is reduced.

Fourth Embodiment

This embodiment illustrates a temperature regulator 4 which has a similar configuration to the temperature regulator 1 according to the first embodiment. Accordingly, only the difference of the temperature regulator 4 from the temperature regulator 1 will be described hereinafter.

Figure 6:
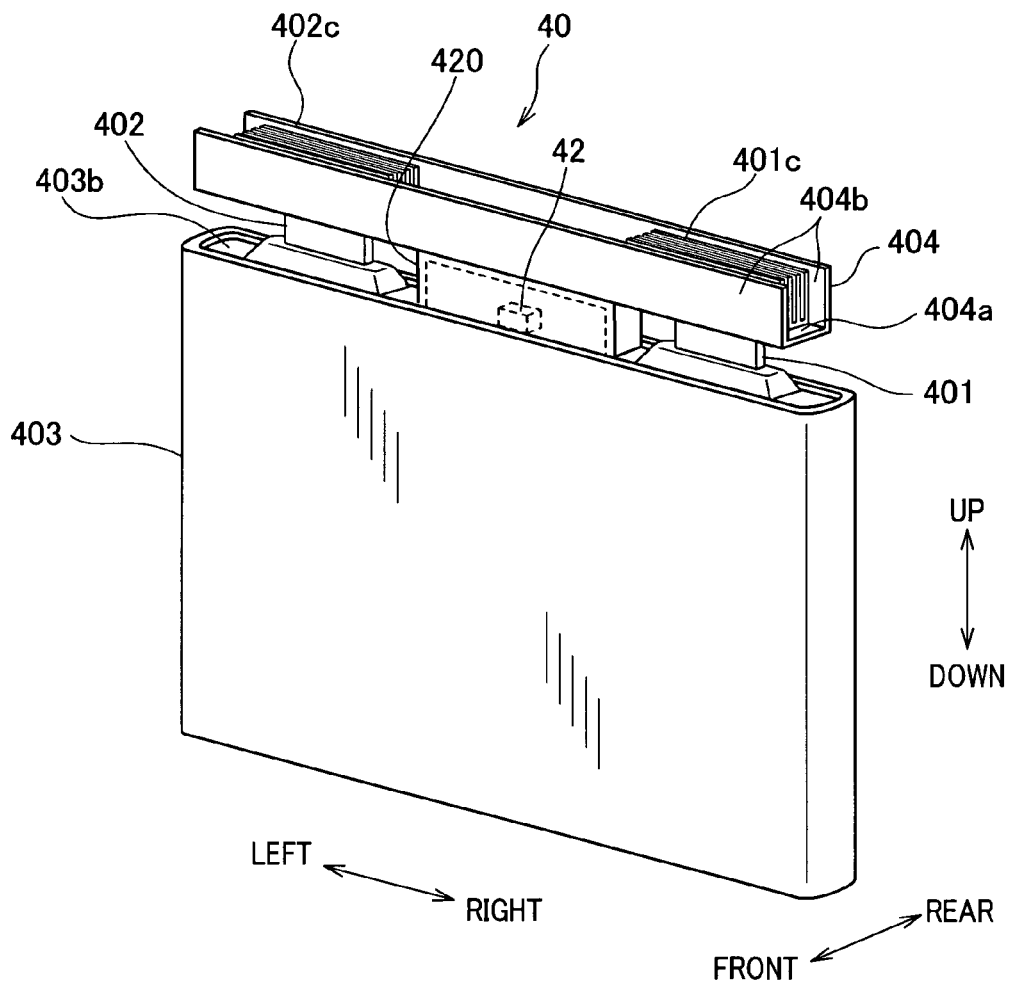
FIG. 6 is a perspective view of a battery according to the fourth embodiment of the invention.
Figure 7:
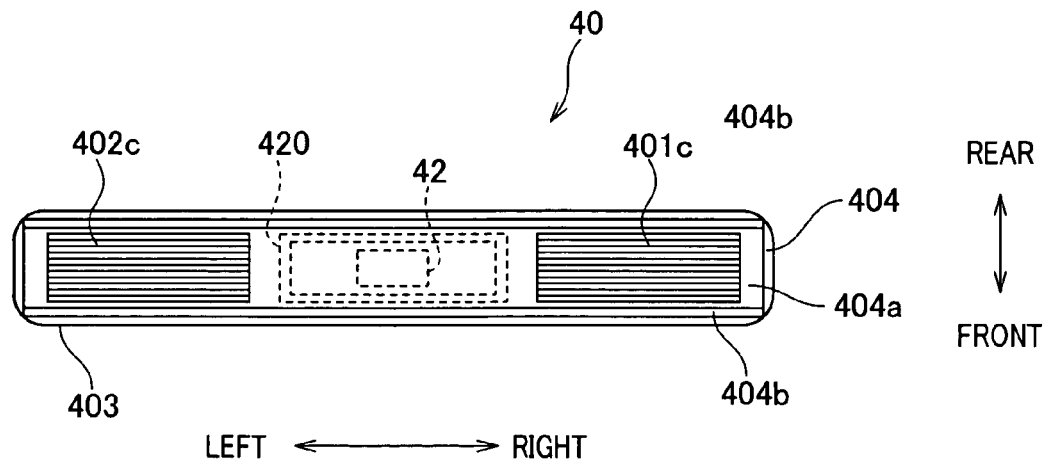
FIG. 7 is a top view of the battery shown in FIG. 6.
Figure 8:
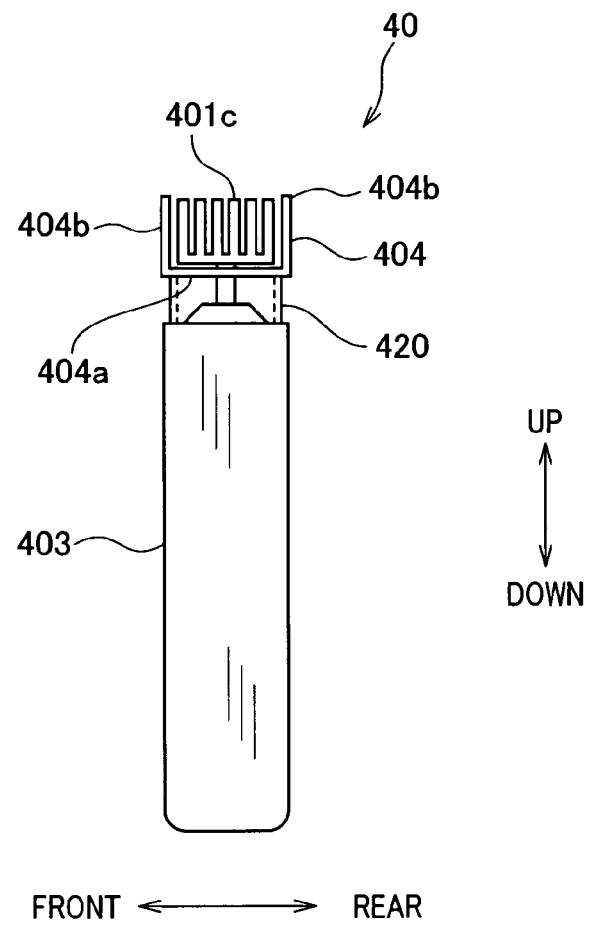
FIG. 8 is a side view of the battery shown in FIG. 6.

The temperature regulator 4 is designed to regulate the temperature of a lithium-ion battery 40 in a motor vehicle. FIGS. 6, 7, and 8 together show the overall configuration of the battery 40. It should be noted that in those figures, the forward and backward directions, leftward and rightward directions, and upward and downward directions are introduced only for convenience of explanation.

The battery 40 includes an electrode body 400 (not shown), a cathode terminal 401, an anode terminal 402, a casing 403, and heat sinks 401c and 402c, which are respectively identical to the electrode body 100, cathode terminal 101, anode terminal 102, casing 103 and heat sinks 101c and 102c of the battery 10 according to the first embodiment.

The battery 40 further includes a flow passage forming member 404 that is fixed to the end portions of the cathode and anode terminals 401 and 402 protruding outside of the casing 403. The flow passage forming member 404 is made of a resin and has a flow passage of the cooling air formed therein. More specifically, the flow passage forming member 404 has a bottom wall 404a and a pair of side walls 404b. The bottom wall 404a has the shape of a rectangular plate, and is fixed to the end portions of the cathode and anode terminals 401 and 402 with the lengthwise direction thereof coinciding with the leftward/rightward direction of the battery 40. The side walls 404b each have the shape of a rectangular plate, and stand respectively on opposite widthwise end portions of the bottom wall 404a to extend in the lengthwise direction of the bottom wall 404a. The bottom wall 404a and side walls 404b cover both the heat sinks 401c and 402c respectively from the lower, front, and rear sides of those heat sinks.

The temperature regulator 4 is configured with a fan 41 (not shown), a temperature sensor 42, and a controller 43 (not shown), which are respectively identical to the fan 11, temperature sensor 12, and controller 13 of the temperature regulator 1 according to the first embodiment.

The cooling air discharged by the fan 41 flows through the flow passage formed in the flow passage forming member 404, cooling the heat sinks 401c and 402c.

The temperature sensor 42 is mounted on a central portion of the lid portion 403b of the casing 403. Further, the temperature sensor 42 is completely covered by a cover 420. The cover 420 is made of a resin, and has the shape of an open rectangular box with the open end closed by the lid portion 403b of the casing 403. Furthermore, in the present embodiment, the cover 420 is integrally formed with the flow passage forming member 404.

According to the present embodiment, the following advantages can be further obtained.

In the present embodiment, the battery 40 includes the flow passage forming member 404 that has the flow passage formed therein. The heat sinks 401c and 402c are located in the flow passage. The cooling air discharged by the fan 41 flows through the flow passage, thereby reliably cooling the heat sinks 401c and 402c. Consequently, the electrode body 400 of the battery 40 can also be reliably cooled via the heat sinks 401c and 402c and the cathode and anode terminals 401 and 402.

Moreover, in the present embodiment, the number of components of the battery 40 is reduced with the integral formation of the cover 420 with the flow passage forming member 404.

Fifth Embodiment

This embodiment illustrates a temperature regulator 5 which has a similar configuration to the temperature regulator 4 according to the fourth embodiment. Accordingly, only the difference of the temperature regulator 5 from the temperature regulator 4 will be described hereinafter.

Figure 9:
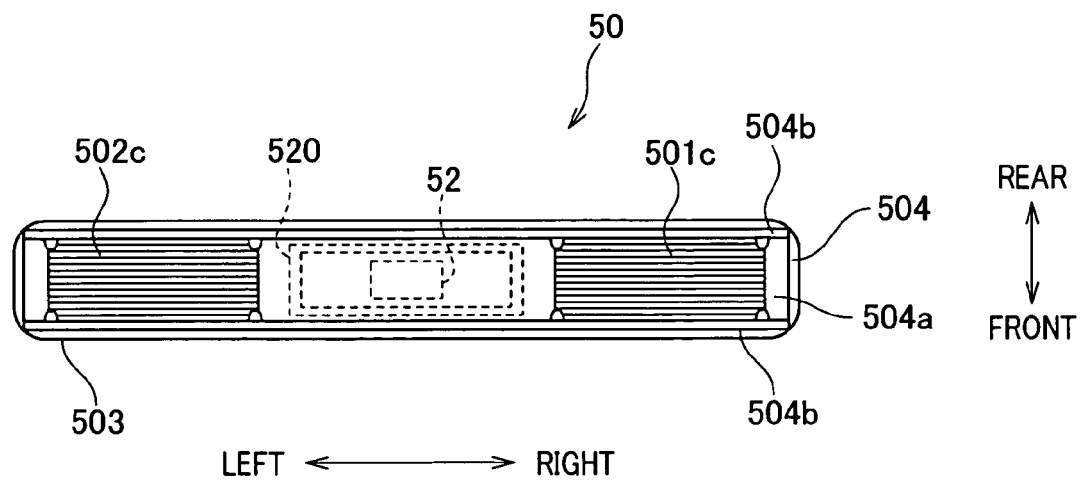
FIG. 9 is a top view of a battery according to the fifth embodiment of the invention.
Figure 10:
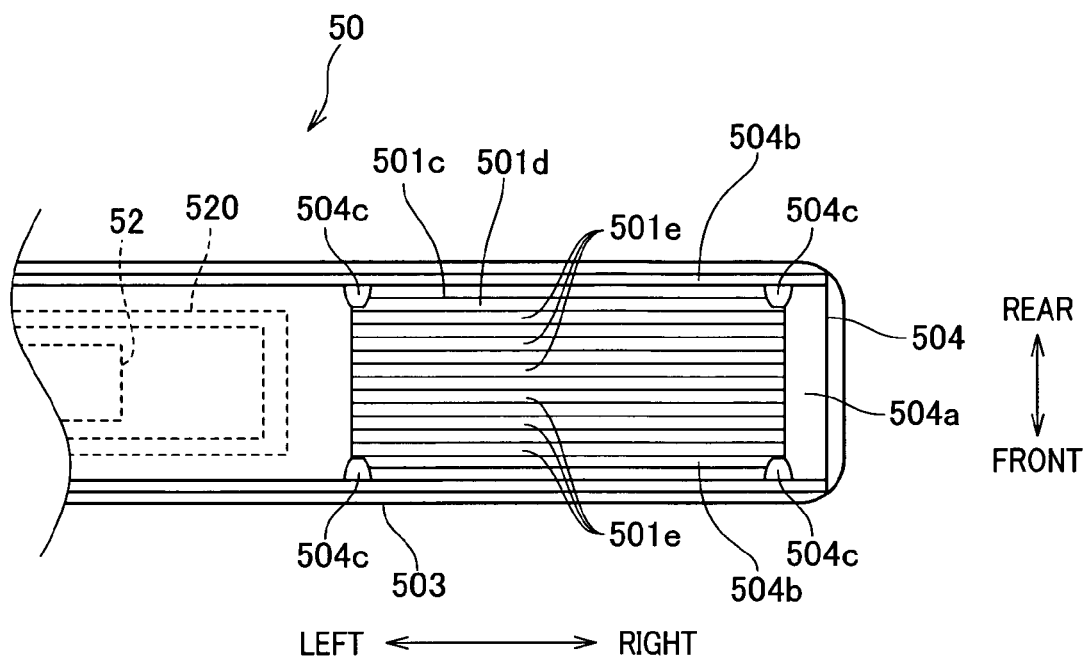
FIG. 10 is an enlarged top view showing, part of the battery shown in FIG. 9.
Figure 11:
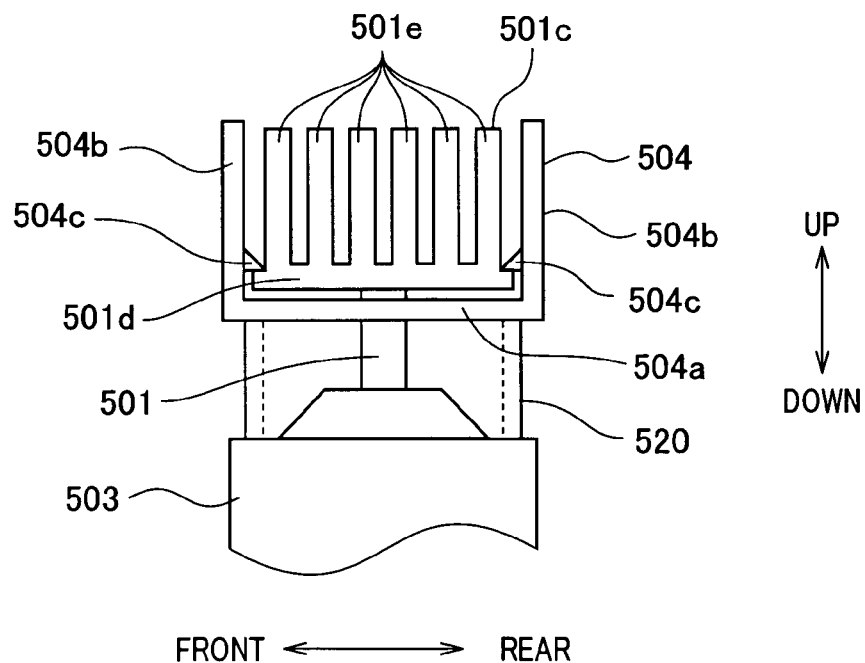
FIG. 11 is a side view of the part of the battery shown in FIG. 10.

The temperature regulator 5 is designed to regulate the temperature of a lithium-ion battery 50 in a motor vehicle. FIGS. 9, 10, and 11 together show the overall configuration of the battery 50. It should be noted that in those figures, the forward and backward directions, leftward and rightward directions, and upward and downward directions are introduced only for convenience of explanation.

The battery 50 includes an electrode body 500 (not shown), a cathode terminal 501, an anode terminal 502 (not shown), and a casing 503, which are respectively identical to the electrode body 400, cathode terminal 401, anode terminal 402, and casing 403 of the battery 40 according to the fourth embodiment.

The battery 50 further includes a pair of heat sinks 501c and 502c and a flow passage forming member 504.

The heat sinks 501c and 502c are respectively both thermally and electrically connected to the ends of the cathode and anode terminals 501 and 502 protruding outside of the casing 503.

More specifically, as shown in FIGS. 10 and 11, the heat sink 501c includes a base portion 501d and a plurality of fins 501e. The base portion 501d has the shape of a rectangular plate. Each of the fins 501e has the shape of a rectangular plate and stands on the base portion 501d to extend in the lengthwise direction of the base portion 501d. Further, the fins 501e are spaced in the widthwise direction of the based portion 501d at predetermined intervals without occupying opposite widthwise end portions of the base portion 501d. Moreover, the heat sink 501c is so oriented in the battery 50 that the lengthwise direction of the base portion 501d of the heat sink 501c coincides with the leftward/rightward direction of the battery 50.

Similarly, though not graphically shown, the heat sink 502c includes a base portion 502d and a plurality of fins 502e. The base portion 502d has the shape of a rectangular plate. Each of the fins 502e has the shape of a rectangular plate and stands on the base portion 502d to extend in the lengthwise direction of the base portion 502d. Further, the fins 502e are spaced in the widthwise direction of the based portion 502d at predetermined intervals without occupying opposite widthwise end portions of the base portion 502d. Moreover, the heat sink 502c is so oriented in the battery 50 that the lengthwise direction of the base portion 502d of the heat sink 502c coincides with the leftward/rightward direction of the battery 50.

The flow passage forming member 504 is fixed to the end portions of the cathode and anode terminals 501 and 502 protruding outside of the casing 503. The flow passage forming member 504 has a flow passage of the cooling air formed therein. More specifically, the flow passage forming member 504 has a bottom wall 504a and a pair of side walls 504b. The bottom wall 504a has the shape of a rectangular plate, and is fixed to the end portions of the cathode and anode terminals 501 and 502 with the lengthwise direction thereof coinciding with the leftward/rightward direction of the battery 50. The side walls 504b each have the shape of a rectangular plate, and stand respectively on opposite widthwise end portions of the bottom wall 504a to extend in the lengthwise direction of the bottom wall 504a. Further, on the inner surface of each of the side walls 504b, there are formed a plurality of claw portions 504c.

The heat sink 501c is, referring again to FIGS. 10 and 11, received in the interior space of the flow passage forming member 504 surrounded by the bottom wall 504a and side walls 504b. Further, the widthwise end portions of the base portion 501d of the heat sink 501c engage with the corresponding claw portions 504c of the side walls 504b of the flow passage forming member 504, thereby fixing the heat sink 501c to the flow passage forming member 504. Similarly, though not graphically shown, the heat sink 502c is received in the interior space of the flow passage forming member 504. Further, the widthwise end portions of the base portion 502d of the heat sink 502c engage with the corresponding claw portions 504c of the side walls 504b of the flow passage forming member 504, thereby fixing the heat sink 502c to the flow passage forming member 504.

The temperature regulator 5 is configured with a fan 51 (not shown), a temperature sensor 52, and a controller 53 (not shown), which are respectively identical to the fan 41, temperature sensor 42, and controller 43 of the temperature regulator 4 according to the fourth embodiment. The temperature sensor 52 is mounted on the casing 503. Further, the temperature sensor 52 is completely covered by a cover 520 which is identical to the cover 420 of the fourth embodiment.

According to the present embodiment, the following advantages can be further obtained.

In the present embodiment, the heat sinks 501c and 502c are configured to be fixed to the flow passage forming member 504. Therefore, in assembly of the battery 50, it is possible to: first fix the heat sinks 501c and 502c to the flow passage forming member 504; and then connect the heat sinks 501c and 502c and flow passage forming member 504 as an integrated component to the cathode and anode terminals 501 and 502. As a result, the efficiency of the assembly can be improved.

Sixth Embodiment

This embodiment illustrates a temperature regulator 6 which has a similar configuration to the temperature regulator 1 according to the first embodiment. Accordingly, only the difference of the temperature regulator 6 from the temperature regulator 1 will be described hereinafter.

Figure 12:
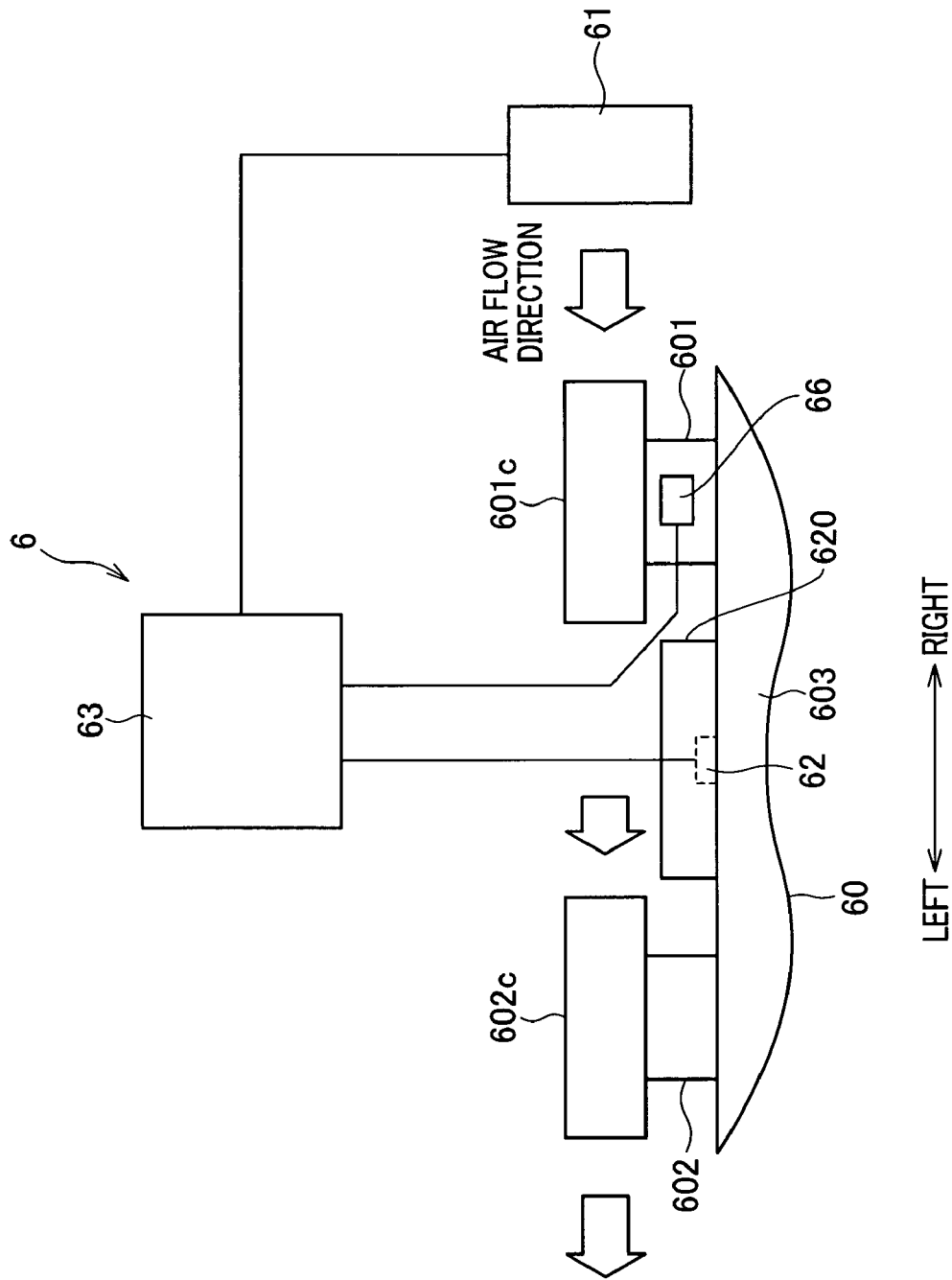
FIG. 12 is a schematic view showing the overall configuration of a temperature regulator according to the sixth embodiment of the invention.
Figure 13:
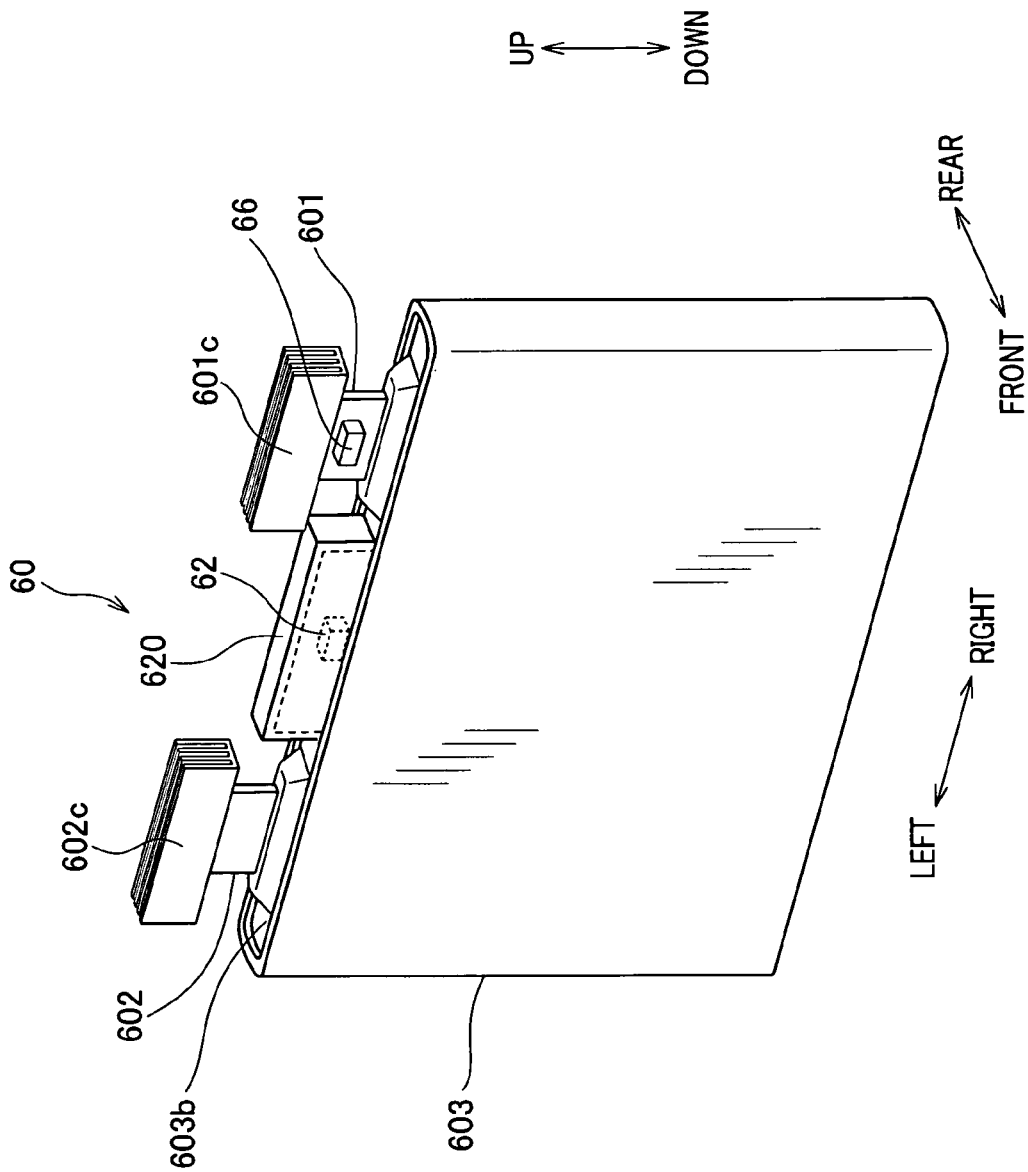
FIG. 13 is a perspective view of a battery according to the sixth embodiment of the invention.

FIG. 12 shows the overall configuration of the temperature regulator 6, which is designed to regulate the temperature of a lithium-ion battery 60 in a motor vehicle. FIG. 13 shows the overall configuration of the battery 60. It should be noted that in FIGS. 12 and 13, the forward and backward directions, leftward and rightward directions, and upward and downward directions are introduced only for convenience of explanation.

The battery 60 includes an electrode body 600 (not shown), a cathode terminal 601, an anode terminal 602, a casing 603, and heat sinks 601c and 602c, which are respectively identical to the electrode body 100, cathode terminal 101, anode terminal 102, casing 103, and heat sinks 101c and 102c of the battery 10 according to the first embodiment.

The temperature regulator 6 is configured with a fan 61, temperature sensors 62 and 66, and a controller 63.

The fan 61 and the temperature sensor 62 are respectively identical to the fan 11 and temperature sensor 12 of the temperature regulator 1 according to the first embodiment. The temperature sensor 62 is mounted on a lid portion 603b of the casing 603 of the battery 60. Further, the temperature sensor 62 is completely covered by a cover 620 which is identical to the cover 120 of the first embodiment.

The temperature sensor 66 is mounted on the end portion of the cathode terminal 601, which protrudes outside of the casing 603 and is thus to be exposed to the flow of the cooling air, to sense the temperature of the cathode terminal 601.

The controller 63 controls, based on both temperatures sensed by the temperature sensors 62 and 66, the fan 61 to adjust the flow rate of the cooling air, thereby regulating the temperature of the electrode body 600 of the battery 60. To this end, the controller 63 has an input terminal connected to the temperature sensor 62, via which it inputs from the temperature sensor 62 a signal that indicates the temperature sensed by the temperature sensor 62. The controller 63 also has an input terminal connected to the temperature sensor 66, via which it inputs from the temperature sensor 66 a signal that indicates the temperature sensed by the temperature sensor 66. The controller 63 further has an output terminal connected to the fan 61, via which it outputs to the fan 61 a signal that indicates the flow rate of the cooling air to be discharged by the fan 61.

Next, with reference to FIGS. 12 and 13, operation of the temperature regulator 6 will be described.

In the present embodiment, the controller 63 first computes, based on the temperatures sensed by the temperature sensors 62 and 66, a temperature difference between the temperature of the casing 603 and the temperature of the cathode terminal 601. As described above, the temperature sensors 62 and 66 respectively sense the temperature of the casing 603 and the temperature of the cathode terminal 601. Then, based on the temperature difference, the controller 63 corrects the temperature sensed by the temperature sensor 62, obtaining a corrected temperature. Compared to the temperature sensed by the temperature sensor 62, the corrected temperature more accurately represents the temperature of the electrode body 600 of the battery 60. Thereafter, based on the corrected temperature, the controller 63 controls the fan 61 to adjust the flow rate of the cooling air.

More specifically, when the corrected temperature is above a predetermined range, the controller 63 controls the fan 61 to start its operation when it is stopped or to discharge more of the cooling air when it is running. Here, the predetermined range has the same definition as in the first embodiment. Consequently, the electrode body 600 of the battery 60 is cooled via the cathode and anode terminals 601 and 602 and heat sinks 601c and 602c, thereby decreasing the temperature of the electrode body 60 to the predetermined range. As a result, the temperature of the electrode body 600 can be regulated to fall within the predetermined range.

On the other hand, when the corrected temperature is below the predetermined range, the controller 63 controls the fan 61 to discharge less of the cooling air or event to stop its operation. Consequently, the cooling of the electrode body 600 is restrained, thereby increasing the temperature of the electrode body 600 to the predetermined range. As a result, the temperature of the electrode body 600 can be regulated to fall within the predetermined range.

According to the present embodiment, the following advantages can be further obtained.

In the present embodiment, the controller 63 controls the fan 61 to adjust the flow rate of the cooling air based not only on the temperature sensed by the temperature sensor 62 but also on the temperature sensed by the temperature sensor 66. More specifically, as described above, the controller 63 controls the fan 61 based on the corrected temperature which is obtained by correcting the temperature sensed by the temperature sensor 62 based on the temperature difference between the temperatures sensed by the temperature sensors 62 and 66. The corrected temperature more accurately represents the temperature of the electrode body 600 than the temperature sensed by the temperature sensor 62. Consequently, based on the corrected temperature, the controller 63 can more suitably control the fan 61 to adjust the flow rate of the cooling air. In other words, the temperature regulator 6 can more suitably regulate the temperature of the electrode body 600 based on both the temperatures sensed by the temperature sensors 62 and 66.

In addition, compared to a conventional method in which the corrected temperature is obtained by performing a complicated correction process based only on the temperature sensed by the temperature sensor 62, it is possible to more easily and suitably correct the temperature sensed by the temperature sensor 62.

Seventh Embodiment

This embodiment illustrates a temperature regulator 7 which has a similar configuration to the temperature regulator 6 according to the sixth embodiment. Accordingly, only the difference of the temperature regulator 7 from the temperature regulator 6 will be described hereinafter.

Figure 14:
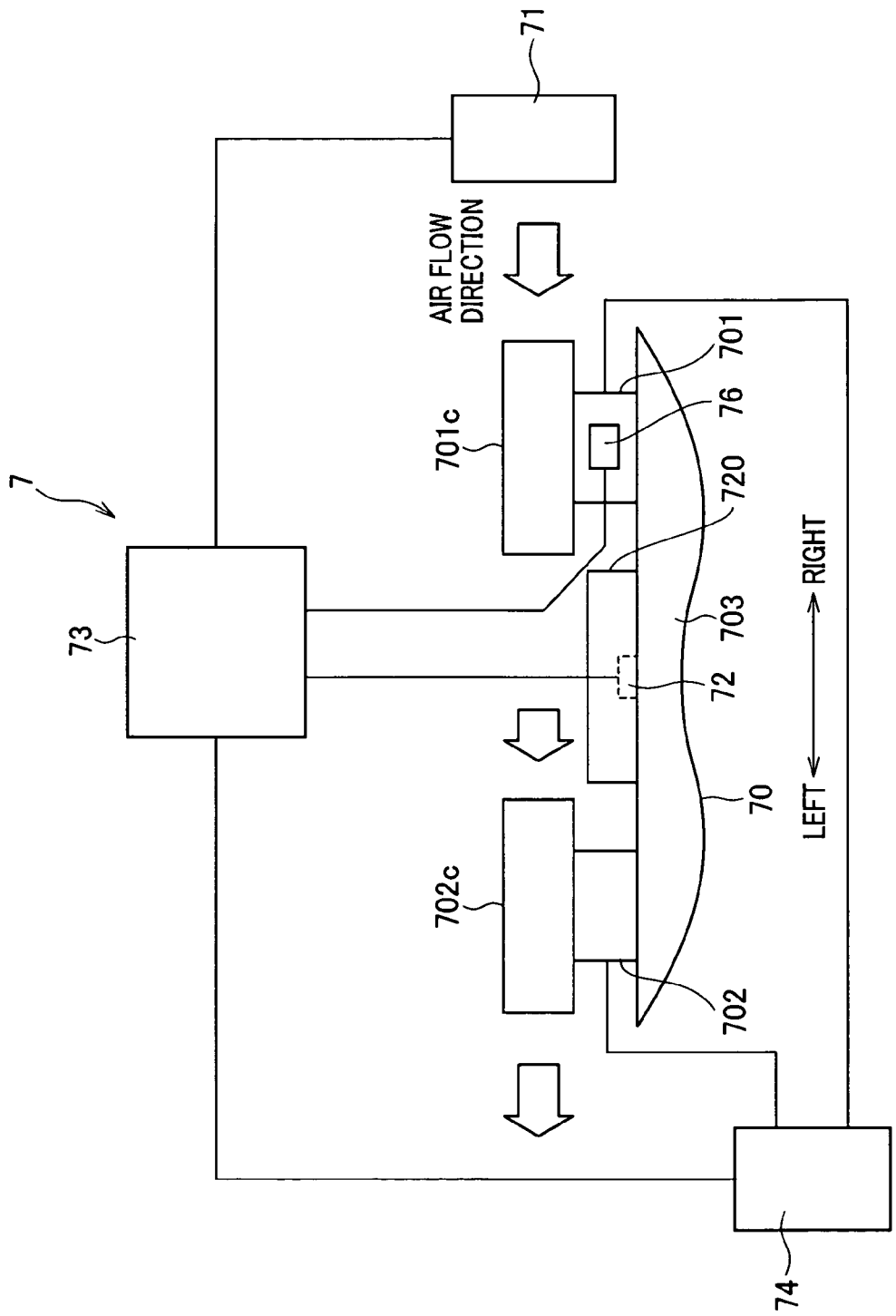
FIG. 14 is a schematic view showing the overall configuration of a temperature regulator according to the seventh embodiment of the invention.

FIG. 14 shows the overall configuration of the temperature regulator 7, which is designed to regulate the temperature of a lithium-ion battery 70 in a motor vehicle. It should be noted that in FIG. 14, the leftward and rightward directions are introduced only for convenience of explanation.

The battery 70 includes an electrode body 700 (not shown), a cathode terminal 701, an anode terminal 702, a casing 703, and heat sinks 701c and 702c, which are respectively identical to the electrode body 600, cathode terminal 601, anode terminal 602, casing 603, and heat sinks 601c and 602c of the battery 60 according to the sixth embodiment.

The temperature regulator 7 is configured with a fan 71, temperature sensors 72 and 76, a controller 73, and a charge/discharge current adjuster 74.

The fan 71 and temperature sensors 72 and 76 are respectively identical to the fan 61 and temperature sensors 62 and 66 of the temperature regulator 6 according to the sixth embodiment. The temperature sensor 72 is mounted on the casing 703 of the battery 70, and is completely covered by a cover 720. The temperature sensor 76 is mounted on the end portion of the cathode terminal 701, which protrudes outside of the casing 703 and is thus to be exposed to the flow of the cooling air, to sense the temperature of the cathode terminal 701.

The controller 73 controls, based on both the temperatures sensed by the temperature sensors 72 and 76, the fan 71 to adjust the flow rate of the cooling air and the charge/discharge current adjuster 74 to adjust the charge/discharge current of the battery 70, thereby regulating the temperature of the electrode body 700 of the battery 70.

The charge/discharge current adjuster 74 adjusts, under control of the controller 73, the charge/discharge current of the battery 70. The charge/discharge current adjuster 74 has an input terminal that is connected to an output terminal of the controller 73; it also has a pair of output terminals that are respectively connected to the cathode and anode terminals 701 and 702 of the battery 70.

Next, with reference to FIG. 14, operation of the temperature regulator 7 will be described.

In the present embodiment, the controller 73 first computes, based on the temperatures sensed by the temperature sensors 72 and 76, a temperature difference between the temperature of the casing 703 and the temperature of the cathode terminal 701. Then, based on the temperature difference, the controller 73 corrects the temperature sensed by the temperature sensor 72, obtaining a corrected temperature. Compared to the temperature sensed by the temperature sensor 72, the corrected temperature more accurately represents the temperature of the electrode body 700 of the battery 70.

Thereafter, based on the corrected temperature, the controller 73 controls the fan 71 to adjust the flow rate of the cooling air and the charge/discharge current adjuster 74 to adjust the charge/discharge current of the battery 70.

More specifically, when the corrected temperature is above a predetermined range, the controller 73 controls the fan 71 to start its operation when it is stopped or to discharge more of the cooling air when it is running. Here, the predetermined range has the same definition as in the first embodiment. Simultaneously or alternatively, the controller 73 controls the charge/discharge current adjuster 74 to decrease the charge/discharge current of the battery 70. Consequently, the electrode body 700 of the battery 70 is cooled via the cathode and anode terminals 701 and 702 and heat sinks 701c and 702c and/or comes to generate less heat, thereby decreasing the temperature of the electrode body 700 to the predetermined range. As a result, the temperature of the electrode body 700 can be regulated to fall within the predetermined range.

On the other hand, when the corrected temperature is below the predetermined range, the controller 73 controls the fan 71 to discharge less of the cooling air or event to stop its operation. Simultaneously or alternatively, the controller 73 controls the charge/discharge current adjuster 74 to increase the charge/discharge current of the battery 70. Consequently, the cooling of the electrode body 700 is restrained and/or the electrode body 700 comes to generate more heat, thereby increasing the temperature of the electrode body 700 to the predetermined range. As a result, the temperature of the electrode body 700 can be regulated to fall within the predetermined range.

The above-described temperature regulator 7 according to the present embodiment has the advantages of both the temperature regulators 2 and 6 according to the second and six embodiments.

Eighth Embodiment

This embodiment illustrates a temperature regulator 8 which has a similar configuration to the temperature regulator 1 according to the first embodiment. Accordingly, only the difference of the temperature regulator 8 from the temperature regulator 1 will be described hereinafter.

Figure 15:
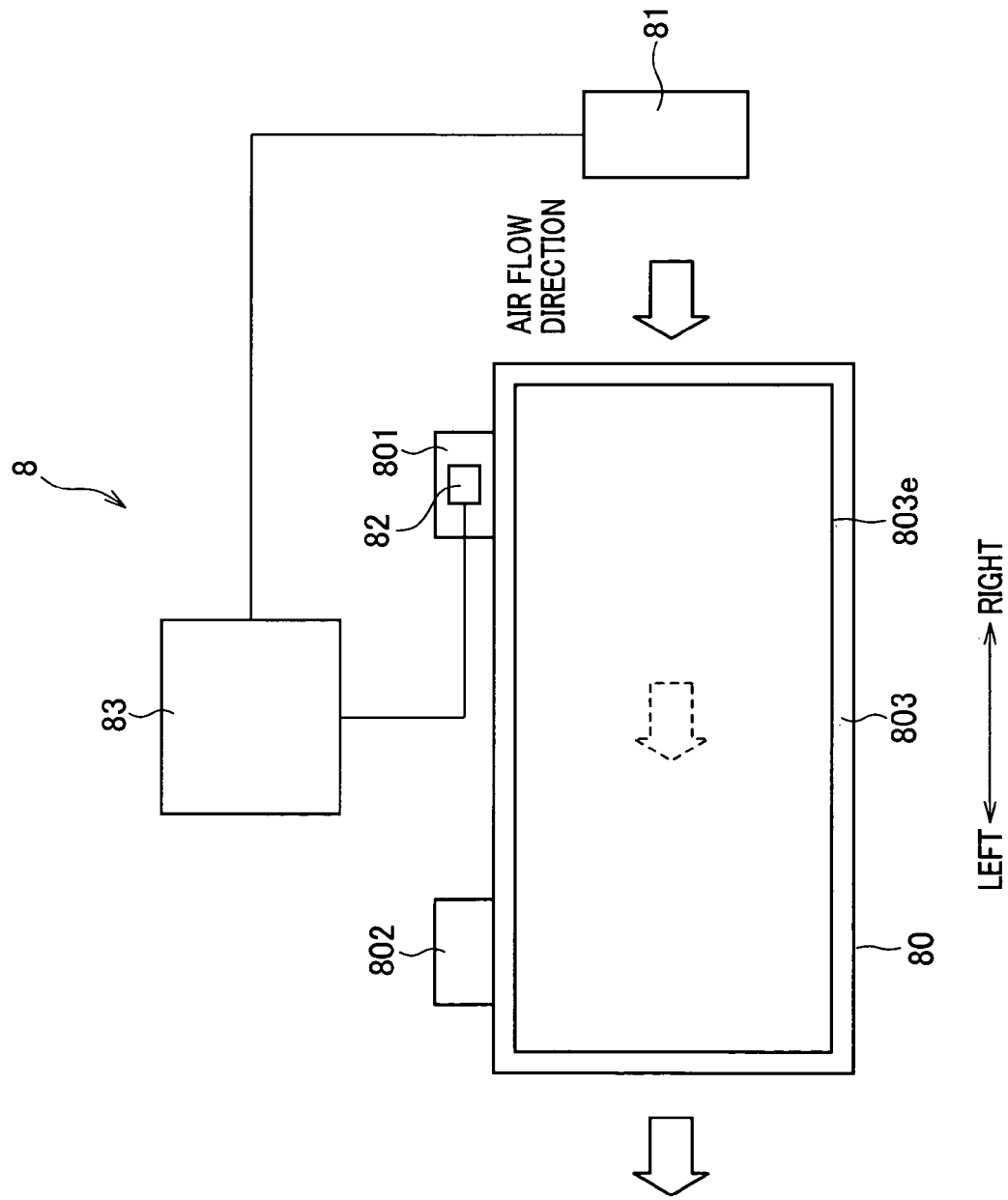
FIG. 15 is a schematic view showing the overall configuration of a temperature regulator according to the eighth embodiment of the invention.
Figure 16:
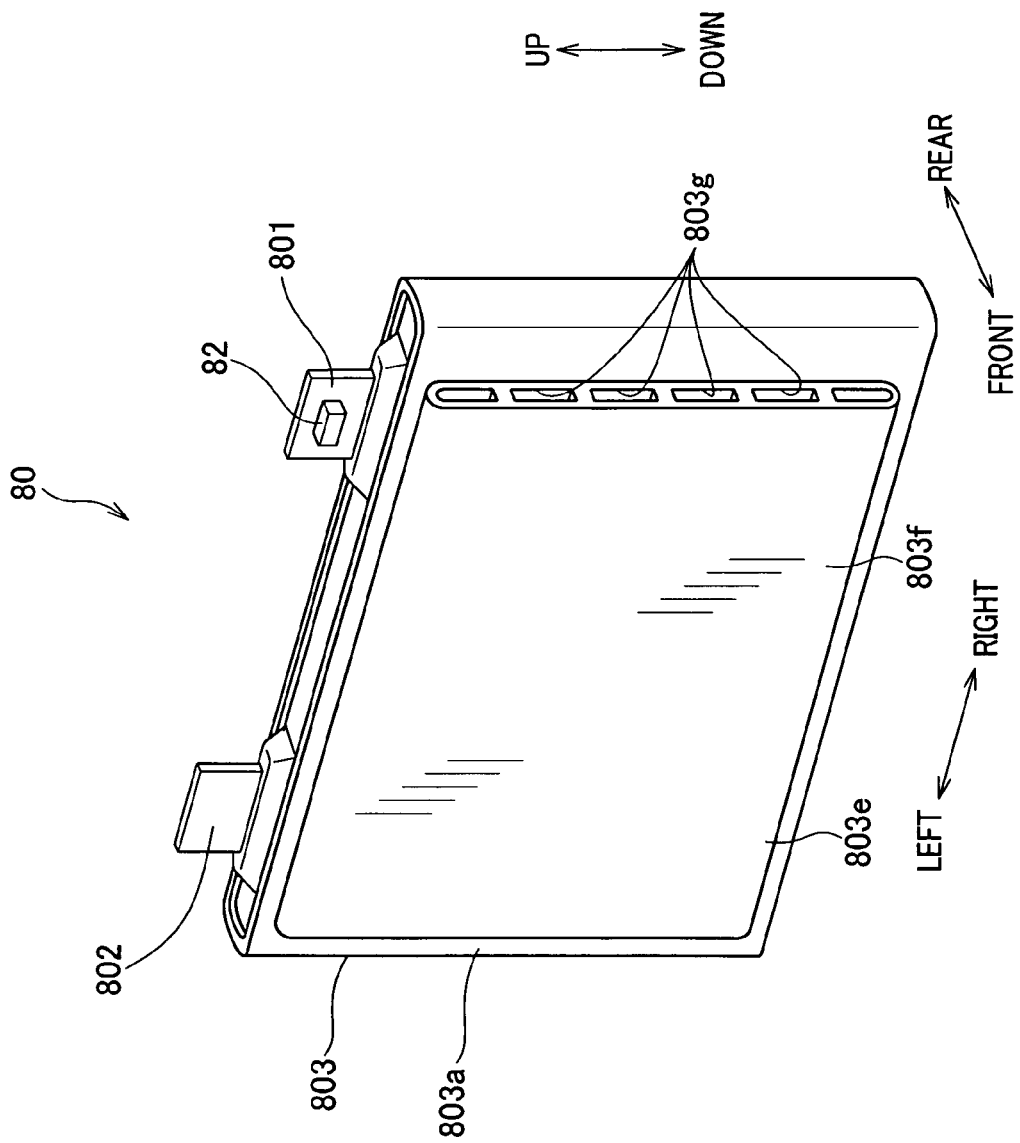
FIG. 16 is a perspective view of a battery according to the eighth embodiment of the invention.
Figure 17:
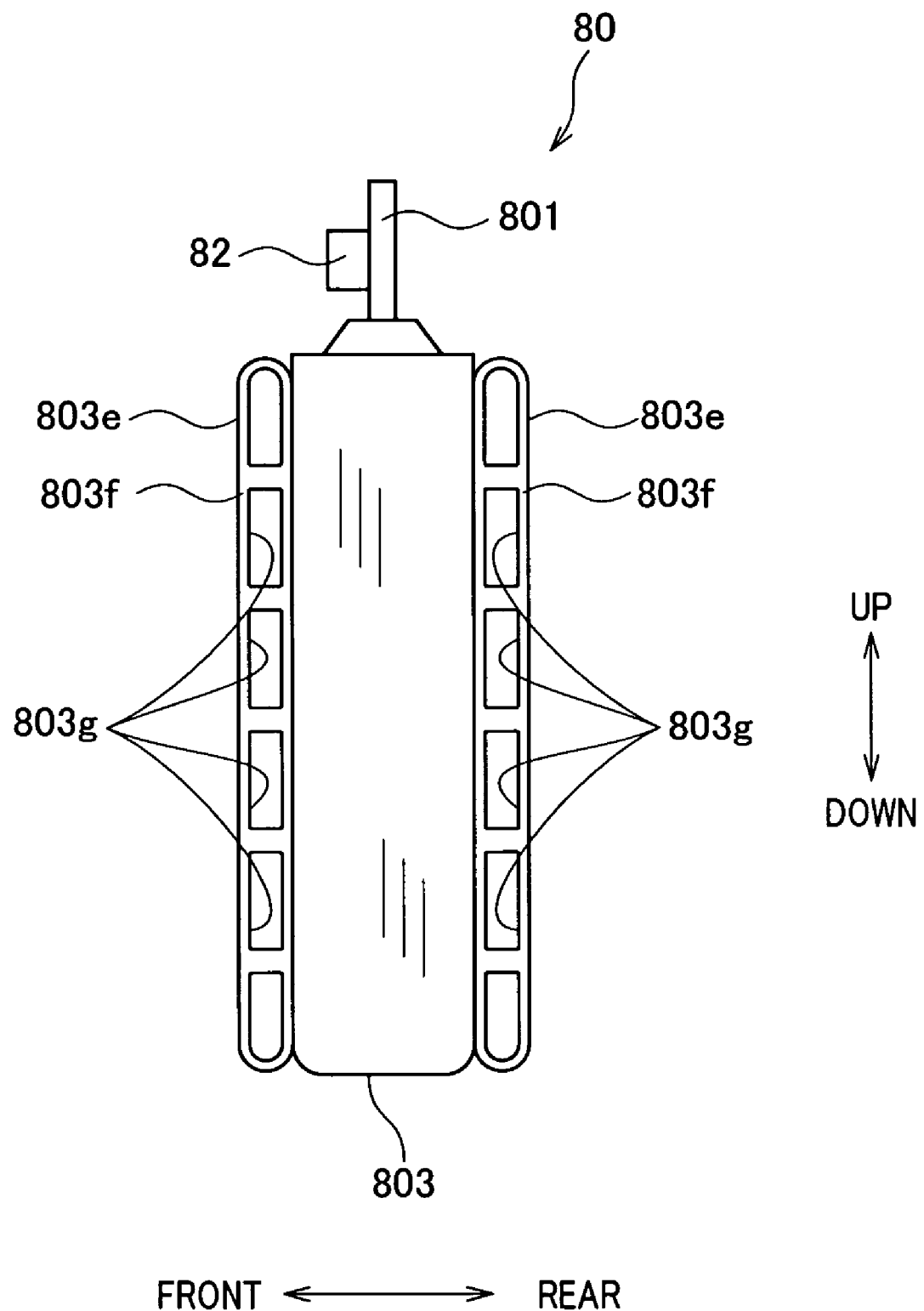
FIG. 17 is a side view of the battery shown in FIG. 16.

FIG. 15 shows the overall configuration of the temperature regulator 8, which is designed to regulate the temperature of a lithium-ion battery 80 in a motor vehicle. FIGS. 16 and 17 together show the overall configuration of the battery 80. It should be noted that in FIGS. 15-17, the forward and backward directions, leftward and rightward directions, and upward and downward directions are introduced only for convenience of explanation.

The battery 80 includes an electrode body 800 (not shown), a cathode terminal 801, an anode terminal 802, and a casing 803, which are respectively identical to the electrode body 100, cathode terminal 101, anode terminal 102, and casing 103 of the battery 10 according to the first embodiment.

The battery 80 further includes a pair of heat sinks 803e which are different from the heat sinks 101c and 102c of the battery 10 according to the first embodiment.

Referring to FIGS. 16 and 17, in the present embodiment, the heat sinks 803e are respectively mounted on the front and rear surfaces of the casing 803. Each of the heat sinks 803e is made of aluminum, and has a large surface area contacting the cooling air so as to have higher heat-transferring capability than the casing 803.

More specifically, each of the heat sinks 803e includes a body portion 803f and a plurality of through-holes 803g. The body portion 803f is formed with a rectangular plate of a given thickness. Each of the through-holes 803*g* is formed in the body portion 803*f* to extend in the lengthwise direction of the body portion 803*f*. Further, the through-holes 803*g* are spaced in the widthwise direction of the body portion 803*f* at predetermined intervals.

Moreover, the heat sinks 803*e* are respectively thermally connected to the front and rear surfaces of the casing 803 with the lengthwise directions of the body portions 803*f* coinciding with the leftward/rightward direction of the battery 80.

Referring now to FIG. 15, the temperature regulator 8 is configured with a fan 81, a temperature sensor 82, and a controller 83.

The fan 81 is provided to produce a flow of cooling air passing through the heat sinks 803*e*, thereby cooling the casing 803. More specifically, the fan 81 is arranged on the right side of the heat sinks 803*e* in close vicinity thereto, and produces the flow of the cooling air in the leftward direction. Moreover, the fan 81 is controlled by the controller 83 to adjust the flow rate of the cooling air.

In addition, with the above arrangement of the fan 81, each of the through-holes 803*g* of the heat sinks 803*e* makes up a flow passage of the cooling air. In other words, each of the heat sinks 803*e* also serves as a flow passage forming member for forming the flow passages of the cooling air.

The temperature sensor 82 is provided to sense the temperature of the cathode terminal 801 that is not exposed to the flow of the cooling air and is thus not directly cooled by the cooling air. More specifically, the temperature sensor 82 is mounted on the surface of that end portion of the cathode terminal 801 which protrudes outside of the casing 803.

The controller 83 is provided to regulate the temperature of the electrode body 800. More specifically, the controller 83 controls, based on the temperature sensed by the temperature sensor 82, the fan 81 to adjust the flow rate of the cooling air, thereby regulating the temperature of the electrode body 800 to fall within a predetermined range. Here, the predetermined range has the same definition as in the first embodiment. To this end, the controller 83 has an input terminal connected to the temperature sensor 82, via which it inputs from the temperature sensor 82 a signal that indicates the temperature sensed by the temperature sensor 82. The controller 83 also has an output terminal connected to the fan 81, via which it outputs to the fan 81*a* signal that indicates the flow rate of the cooling air to be discharged by the fan 81.

The above-described temperature regulator 8 according to the present embodiment operates in the same way as the temperature regulator 1 according to the first embodiment, except that the fan 81 cools the casing 803 via the heat sinks 803*e* and the temperature sensor 82 senses the temperature of the cathode terminal 801.

Consequently, the temperature regulator 8 according to the present embodiment can achieve the same advantages as the temperature regulator 1 according to the first embodiment.

While the above particular embodiments of the invention have been shown and described, it will be understood by those skilled in the art that various modifications, changes, and improvements may be made without departing from the spirit of the invention.

For example, in the first to seventh embodiments, the cathode and anode terminals are configured to be cooled by the cooling air via the heat sinks. However, the cathode and anode terminals may also be configured to be directly cooled by the cooling air without using the heat sinks. Similarly, in the eighth embodiment, the casing is configured to be cooled by the cooling air via the heat sinks. However, the casing may also be configured to be directly cooled by the cooling air without using the heat sinks.

In the first to eighth embodiments, the temperature regulators regulate the temperature of the batteries by cooling them. However, in the case of the batteries being used in a low-temperature environment, the temperature regulators may be configured to regulate the temperature of the batteries by heating them.

In the first to eighth embodiments, air is used as a heat transfer medium to exchange heat either with the cathode terminal or with the casing. However, it is also possible to use other heat transfer mediums instead of air.

In the first to eighth embodiments, the temperature regulators are used to regulate the temperature of the lithium-ion batteries. However, the temperature regulators may also be used to regulate the temperature of batteries of any other types which include an electrode body and are rechargeable.

Moreover, it is also possible to combine the configurations of the temperature regulators according to the second to seventh embodiments with the configuration of the temperature regulator according to the eighth embodiment.

What is claimed is:

1. A temperature regulator for a battery,
wherein the battery comprises an electrode body, a terminal electrically connected to the electrode body, and a casing that receives the electrode body and supports the terminal with an end portion of the terminal protruding outside of the casing, the casing being electrically and thermally insulated from the terminal,
the temperature regulator comprising:
a flow producer that produces a flow of a heat transfer medium for exchanging heat between the heat transfer medium and one of the terminal and casing of the battery;
a temperature sensor that senses the temperature of the other of the terminal and casing of the battery; and
a controller that controls, based on the temperature sensed by the temperature sensor, the flow producer to adjust the flow rate of the heat transfer medium, thereby regulating the temperature of the electrode body of the battery to fall within a predetermined range.

2. The temperature regulator as set forth in claim 1, further comprising a current adjuster that adjusts the charge current of the battery when the battery is charged and that adjusts the discharge current of the battery when the battery is discharged, wherein the controller further controls, based on the temperature sensed by the temperature sensor, the current adjuster to adjust the charge current of the battery when the battery is charged and to adjust the discharge current of the battery when the battery is discharged.

3. The temperature regulator as set forth in claim 1, wherein the temperature sensor is a first temperature sensor,
the temperature regulator further comprises a second temperature sensor that senses the temperature of the one of the terminal and casing of the battery which exchanges heat with the heat transfer medium, and
the controller controls, based on both the temperatures sensed by the first and second temperature sensors, the flow producer to adjust the flow rate of the heat transfer medium.

4. The temperature regulator as set forth in claim 3, further comprising a current adjuster that adjusts the charge current of the battery when the battery is charged and that adjusts the discharge current of the battery when the battery is discharged, wherein the controller further controls, based on both the temperatures sensed by the first and second temperature sensors, the current adjuster to adjust the charge current of the battery when the battery is charged and to adjust the discharge current of the battery when the battery is discharged.

5. The temperature regulator as set forth in claim 1, wherein the temperature sensor is completely covered by a cover.

6. The temperature regulator as set forth in claim 5, wherein the battery further comprises a sealing member which is made of an electrically and thermally insulative material and via which the terminal is fixed to the casing,
- the temperature sensor is received in a recess formed in the sealing member, and
- the cover is integrally formed with the sealing member to completely cover the temperature sensor.

7. The temperature regulator as set forth in claim 1, wherein the battery further comprises a flow passage forming member that has formed therein a flow passage through which the heat transfer medium flows exchanging heat with the one of the terminal and casing of the battery.

8. The temperature regulator as set forth in claim 7, wherein the temperature sensor is completely covered by a cover, and the cover is integrally formed with the flow passage forming member of the battery.

9. The temperature regulator as set forth in claim 7, wherein the battery further comprises a heat transferring member via which heat is exchanged between the heat transfer medium and the one of the terminal and casing of the battery, the heat transferring member having higher heat-transferring capability than the one of the terminal and casing, and
- the heat transferring member is fixed to the flow passage forming member of the battery.

10. The temperature regulator as set forth in claim 1, wherein the battery further comprises a heat transferring member via which heat is exchanged between the heat transfer medium and the one of the terminal and casing of the battery, the heat transferring member having higher heat-transferring capability than the one of the terminal and casing.

11. The temperature regulator as set forth in claim 1, wherein the battery and the temperature regulator are used in a motor vehicle.

\* \* \* \* \*